(12) United States Patent
Sundararajan et al.

(10) Patent No.: US 11,690,070 B2
(45) Date of Patent: Jun. 27, 2023

(54) TRAFFIC-AWARE GRANT SIGNALING AND PROCESSING

(71) Applicant: QUALCOMM Incorporated, San Diego, CA (US)

(72) Inventors: Jay Kumar Sundararajan, San Diego, CA (US); Wanshi Chen, San Diego, CA (US); Yeliz Tokgoz, San Diego, CA (US); Naga Bhushan, San Diego, CA (US); Prashanth Haridas Hande, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 16/892,086

(22) Filed: Jun. 3, 2020

(65) Prior Publication Data

US 2020/0389915 A1    Dec. 10, 2020

Related U.S. Application Data

(60) Provisional application No. 62/858,867, filed on Jun. 7, 2019.

(51) Int. Cl.
*H04W 72/12* (2023.01)
*H04W 72/23* (2023.01)
(Continued)

(52) U.S. Cl.
CPC ....... *H04W 72/23* (2023.01); *H04W 72/1268* (2013.01); *H04W 72/52* (2023.01); *H04W 72/566* (2023.01)

(58) Field of Classification Search
None
See application file for complete search history.

(56) References Cited

U.S. PATENT DOCUMENTS

| | | | |
|---|---|---|---|
| 2012/0147830 A1* | 6/2012 | Lohr | H04L 1/1854 370/329 |
| 2013/0250924 A1* | 9/2013 | Chen | H04W 72/0446 370/336 |

(Continued)

FOREIGN PATENT DOCUMENTS

WO    WO-2017196380 A1    11/2017

OTHER PUBLICATIONS

Bundling Frames to Save Energy While Streaming Video from LTE Mobile Device, Swaminathan et al (Year: 2013).*

(Continued)

*Primary Examiner* — Kodzovi Acolatse
(74) *Attorney, Agent, or Firm* — Holland & Hart LLP

(57) ABSTRACT

Methods, systems, and devices for wireless communications are described According to one or more aspects of the present disclosure, a user equipment (UE) may receive an uplink grant of an uplink transmission from the UE to the base station. The UE may identify a packet transmission mode indicated in the uplink grant. The indication may specify whether the UE is to transmit the uplink transmission using a default mode, such as a first-in first-out mode, or a packet-group transmission mode. The UE may determine packets for inclusion in a transmission payload for the uplink transmission based on the identified transmission mode and transmit the uplink transmission in accordance with the packet transmission mode and the uplink grant.

59 Claims, 17 Drawing Sheets

(51) Int. Cl.
*H04W 72/1268* (2023.01)
*H04W 72/52* (2023.01)
*H04W 72/566* (2023.01)

(56) References Cited

U.S. PATENT DOCUMENTS

| | | | |
|---|---|---|---|
| 2015/0029903 A1* | 1/2015 | Chen | H04L 1/189 370/277 |
| 2015/0085796 A1* | 3/2015 | Xu | H04W 72/0493 370/329 |
| 2016/0295516 A1* | 10/2016 | Su | H04W 52/24 |
| 2017/0265211 A1* | 9/2017 | Elsayed | H04W 52/0261 |
| 2017/0331595 A1 | 11/2017 | Rudolf et al. | |
| 2020/0042263 A1* | 2/2020 | Iyer | G06F 3/1454 |

OTHER PUBLICATIONS

International Search Report and Written Opinion—PCT/US2020/036057—ISA/EPO—dated Aug. 26, 2020.
Kim J-S., et al., "MPEG-4 Codec Based Uplink Resource Allocation Scheme for the Video Telephony Service in WiBro/WiMAX Systems", Circuits and Systems (ISCAS), 2011 IEEE International Symposium on, IEEE, May 15, 2011 (May 15, 2011), XP031998227, pp. 2753-2756, p. 2753, col. 2, lines 17-20, p. 2754, col. 1, lines 13-19, p. 2754, col. 1, lines 34-53.

\* cited by examiner

TRAFFIC-AWARE GRANT SIGNALING AND PROCESSING

CROSS REFERENCE

The present application for patent claims the benefit of U.S. Provisional Patent Application No. 62/858,867 by SUNDARARAJAN et al., entitled "TRAFFIC-AWARE GRANT SIGNALING AND PROCESSING," filed Jun. 7, 2019, assigned to the assignee hereof, and expressly incorporated by reference herein.

BACKGROUND

The following relates generally to wireless communications, and more specifically to traffic-aware grant signaling and processing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Existing wireless communications systems may receive data packets as a stream of bits, and may assign the data packets to sub-protocol data units based on the received stream of bits. In some cases, the bits are grouped into packets, which are transmitted on a first-in first-out basis. For some high throughput and low latency applications, it may be beneficial to group one or more transmitted packets as a file. As one example, packets in a video frame of an application may be included in a file, in which each file is associated with a separate video frame.

SUMMARY

The described techniques relate to improved methods, systems, devices, and apparatuses that support traffic-aware grant signaling and processing. Generally, the described techniques provide for transmission mode indication and selection such that packets may be transmitted in either a first-in first-out (FIFO) basis (or some other default basis) or in a packet-group basis. The transmission mode may be indicated or selected so as to improve throughput and reduce latency in communication links in wireless communications system. In some cases, the described techniques may be utilized in extended reality (XR) communications environments, which may require high bit rate, high reliability, and low latency communications, and which may also require that packets be grouped and processed together. According to one or more aspects of the present disclosure, a UE may receive an uplink grant of an uplink transmission from the UE to the base station. The UE may identify a packet transmission mode from the uplink grant (for example, via a packet transmission mode indicator included in the uplink grant). The indicator may specify whether the UE is to transmit the uplink transmission using a default mode (such as a FIFO mode) or a packet-group transmission mode. The UE may determine one or more packets for inclusion in a transmission payload for the uplink transmission based on the selected packet transmission mode and transmit the uplink transmission in accordance with the packet transmission mode and the uplink grant.

A method of wireless communication at a UE is described. The method may include receiving, from a base station, an uplink grant for an uplink transmission from the UE to the base station, selecting, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission, determining one or more packets of a set of packets for inclusion in the transmission payload for the uplink transmission in accordance with the uplink grant and based on the selected packet transmission mode, and transmitting, to the base station, the uplink transmission in accordance with the packet transmission mode and the uplink grant.

An apparatus for wireless communication at a UE is described. The apparatus may include a processor, memory coupled with the processor, and instructions stored in the memory. The instructions may be executable by the processor to cause the apparatus to receive, from a base station, an uplink grant for an uplink transmission from the UE to the base station, select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission, determine one or more packets of a set of packets for inclusion in the transmission payload for the uplink transmission in accordance with the uplink grant and based on the selected packet transmission mode, and transmit, to the base station, the uplink transmission in accordance with the packet transmission mode and the uplink grant.

Another apparatus for wireless communication at a UE is described. The apparatus may include means for receiving, from a base station, an uplink grant for an uplink transmission from the UE to the base station, selecting, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission, determining one or more packets of a set of packets for inclusion in the transmission payload for the uplink transmission in accordance with the uplink grant and based on the selected packet transmission mode, and transmitting, to the base station, the uplink transmission in accordance with the packet transmission mode and the uplink grant.

A non-transitory computer-readable medium storing code for wireless communication at a UE is described. The code may include instructions executable by a processor to receive, from a base station, an uplink grant for an uplink transmission from the UE to the base station, select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission, determine one or more packets of a set of packets for inclusion in a transmission payload for the uplink transmission in accordance with the uplink grant and based on the selected packet transmission mode, and transmit, to the base station, the uplink transmission in accordance with the packet transmission mode and the uplink grant.

Some examples of the method, apparatuses, and non-transitory computer-readable medium described herein may further include operations, features, means, or instructions for identifying that the uplink grant includes a packet transmission mode indicator specifying the packet-group transmission mode, where the set of packets may be organized in one or more packet-groups.

In some examples of the method, apparatuses, and non-transitory computer-readable medium described herein, determining the one or more packets for inclusion in the transmission payload further may include operations, features, means, or instructions for determining the one or more packets such that all packets of at least one packet-group may be included in the transmission payload.

In some examples of the method, apparatuses, and non-transitory computer-readable medium described herein, determining the one or more packets for inclusion in the transmission payload further may include operations, features, means, or instructions for determining the one or more packets based on a resource capacity indicated by the uplink grant.

In some examples of the method, apparatuses, and non-transitory computer-readable medium described herein, determining the one or more packets for inclusion in the transmission payload further may include operations, features, means, or instructions for identifying a resource capacity for the transmission payload, and determining the one or more packets such that the transmission payload comprises packets associated with a reduced quantity of packet-groups relative to a quantity of packet groups that the resource capacity supports and based on the transmission payload satisfying a capacity condition.

In some examples of the method, apparatuses, and non-transitory computer-readable medium described herein, determining the one or more packets for inclusion in the transmission payload further may include operations, features, means, or instructions for identifying a resource capacity for the transmission payload; and determining the one or more packets such that the transmission payload comprises packets associated with a reduced quantity of partial packet-groups relative to a quantity of partial packet groups that the resource capacity supports and based on the transmission payload satisfying a capacity condition.

Some examples of the method, apparatuses, and non-transitory computer-readable medium described herein may further include operations, features, means, or instructions for receiving, from the base station, an indication of a capacity condition, where the one or more packets are determined based at least in part on satisfaction of the capacity condition.

In some examples of the method, apparatuses, and non-transitory computer-readable medium described herein, determining the one or more packets for inclusion in the transmission payload further may include operations, features, means, or instructions for determining the one or more packets based on a group selection criterion indicated by the uplink grant.

In some examples of the method, apparatuses, and non-transitory computer-readable medium described herein, the group selection criterion indicates a packet-group type criterion or a packet-group priority criterion.

Some examples of the method, apparatuses, and non-transitory computer-readable medium described herein may further include operations, features, means, or instructions for mapping the one or more packets to the multiple transport blocks such that packets associated with a same packet-group may be mapped to a same transport block.

In some examples of the method, apparatuses, and non-transitory computer-readable medium described herein, determining the one or more packets for inclusion in the transmission payload further may include operations, features, means, or instructions for determining the one or more packets based on a group quantity limitation indicated by the uplink grant, the group quantity limitation indicating a maximum quantity of groups to be included in the transmission payload.

In some examples of the method, apparatuses, and non-transitory computer-readable medium described herein, determining the one or more packets for inclusion in the transmission payload further may include operations, features, means, or instructions for selecting the one or more packets based on a transmission priority associated with the one or more packet-groups.

In some examples of the method, apparatuses, and non-transitory computer-readable medium described herein, the transmission priority may be based on a delivery deadline associated with the one or more packet-groups.

In some examples of the method, apparatuses, and non-transitory computer-readable medium described herein, determining the one or more packets for inclusion in the transmission payload further may include operations, features, means, or instructions for selecting the one or more packets based on a modulation coding scheme associated with a transport block (TB) indicated by the uplink grant.

In some examples of the method, apparatuses, and non-transitory computer-readable medium described herein, determining the one or more packets for inclusion in the transmission payload further may include operations, features, means, or instructions for determining the one or more packets based on a packet-group type, a packet-group priority, a packet delivery deadline, or a combination thereof.

In some examples of the method, apparatuses, and non-transitory computer-readable medium described herein, transmitting the uplink transmission further may include operations, features, means, or instructions for transmitting the transmission payload for the uplink transmission such that the one or more packets may be selected in a non-first-in first-out order.

In some examples of the method, apparatuses, and non-transitory computer-readable medium described herein, determining the one or more packets for inclusion in the transmission payload further may include operations, features, means, or instructions for receiving, from the base station, an indication of a file delay budget or a file error rate, and determining the one or more packets based on the file delay budget or the file error rate.

In some examples of the method, apparatuses, and non-transitory computer-readable medium described herein, the one or more packets may be associated as a file.

In some examples of the method, apparatuses, and non-transitory computer-readable medium described herein, the one or more packets of the file are configured to be processed together.

In some examples of the method, apparatuses, and non-transitory computer-readable medium described herein, the one or more packets may be associated with a same delivery deadline.

In some examples of the method, apparatuses, and non-transitory computer-readable medium described herein, the default transmission mode may be a first-in first-out transmission mode.

A method of wireless communication at a base station is described. The method may include transmitting, to a user equipment (UE), an uplink grant for an uplink transmission from the UE to the base station, where the uplink grant specifies a packet transmission mode from a default transmission mode or a packet-group transmission mode for the uplink transmission, where the packet-group transmission mode specifies that a set of packets that are associated as a packet-group are included in a transmission payload of the uplink transmission and receiving the uplink transmission from the UE, the uplink transmission including the transmission payload including one or more packets in accordance with the uplink grant and the packet transmission mode.

An apparatus for wireless communication at a base station is described. The apparatus may include a processor, memory coupled with the processor, and instructions stored in the memory. The instructions may be executable by the processor to cause the apparatus to transmit, to a user equipment (UE), an uplink grant for an uplink transmission from the UE to the base station, where the uplink grant specifies a packet transmission mode from a default transmission mode or a packet-group transmission mode for the uplink transmission, where the packet-group transmission mode specifies that a set of packets that are associated as a packet-group are included in a transmission payload of the uplink transmission and receive the uplink transmission from the UE, the uplink transmission including the transmission payload including one or more packets in accordance with the uplink grant and the packet transmission mode.

Another apparatus for wireless communication at a base station is described. The apparatus may include means for transmitting, to a user equipment (UE), an uplink grant for an uplink transmission from the UE to the base station, where the uplink grant specifies a packet transmission mode from a default transmission mode or a packet-group transmission mode for the uplink transmission, where the packet-group transmission mode specifies that a set of packets that are associated as a packet-group are included in a transmission payload of the uplink transmission and receiving the uplink transmission from the UE, the uplink transmission including the transmission payload including one or more packets in accordance with the uplink grant and the packet transmission mode.

A non-transitory computer-readable medium storing code for wireless communication at a base station is described. The code may include instructions executable by a processor to transmit, to a user equipment (UE), an uplink grant for an uplink transmission from the UE to the base station, where the uplink grant specifies a packet transmission mode from a default transmission mode or a packet-group transmission mode for the uplink transmission, where the packet-group transmission mode specifies that a set of packets that are associated as a packet-group are included in a transmission payload of the uplink transmission and receive the uplink transmission from the UE, the uplink transmission including the transmission payload including one or more packets in accordance with the uplink grant and the packet transmission mode.

In some examples of the method, apparatuses, and non-transitory computer-readable medium described herein, the uplink grant includes a packet transmission mode indicator specifying the packet-group transmission mode, and where receiving the uplink transmission may include operations, features, means, or instructions for receiving the one or more packets organized into one or more groups in accordance with the packet-group transmission mode.

Some examples of the method, apparatuses, and non-transitory computer-readable medium described herein may include operations, features, means, or instructions for processing the one or more groups of packets in groups in accordance with the packet-group transmission mode.

In some examples of the method, apparatuses, and non-transitory computer-readable medium described herein, processing the one or more groups may include operations, features, means, or instructions for passing packets of each of the one or more groups to an upper layer as one or more protocol data units.

In some examples of the method, apparatuses, and non-transitory computer-readable medium described herein, transmitting the uplink grant further may include operations, features, means, or instructions for transmitting an indication of a resource amount limiting a quantity of packets to be included in the uplink transmission.

In some examples of the method, apparatuses, and non-transitory computer-readable medium described herein, transmitting the uplink grant further may include operations, features, means, or instructions for transmitting a group selection criterion in the uplink grant when the uplink grant specifies the packet-group transmission mode.

In some examples of the method, apparatuses, and non-transitory computer-readable medium described herein, the group selection criterion indicates a packet-group type criterion or a packet-group priority criterion.

In some examples of the method, apparatuses, and non-transitory computer-readable medium described herein, the packet-group priority criterion may be based on a delivery deadline associated with one or more packet-groups.

In some examples of the method, apparatuses, and non-transitory computer-readable medium described herein, receiving the uplink transmission from the UE may include operations, features, means, or instructions for receiving the one or more packets mapped to multiple transport blocks such that packets associated with a same packet-group may be mapped to a same transport block, where the uplink grant may be for transmission of the multiple transport blocks.

In some examples of the method, apparatuses, and non-transitory computer-readable medium described herein, transmitting the uplink grant for the uplink transmission further may include operations, features, means, or instructions for transmitting an indication of a file delay budget or a file delay error rate.

In some examples of the method, apparatuses, and non-transitory computer-readable medium described herein, the one or more packets may be associated as a file.

In some examples of the method, apparatuses, and non-transitory computer-readable medium described herein, the default transmission mode may be a first-in first-out transmission mode.

A method of wireless communication at a base station is described. The method may include identifying that a set of packets are scheduled for a downlink transmission to a UE via a packet-group transmission mode, determining one or more packets of the set of packets for inclusion in a transmission payload for the downlink transmission in accordance with the packet-group transmission mode, and transmitting, to the UE, the downlink transmission in accordance with the packet-group transmission mode.

An apparatus for wireless communication at a base station is described. The apparatus may include a processor, memory coupled with the processor, and instructions stored in the memory. The instructions may be executable by the processor to cause the apparatus to identify that a set of packets are scheduled for a downlink transmission to a UE via a packet-group transmission mode, determine one or more packets of the set of packets for inclusion in a transmission payload for the downlink transmission in accordance with the packet-group transmission mode, and transmit, to the UE, the downlink transmission in accordance with the packet-group transmission mode.

Another apparatus for wireless communication at a base station is described. The apparatus may include means for identifying that a set of packets are scheduled for a downlink transmission to a UE via a packet-group transmission mode, determining one or more packets of the set of packets for inclusion in a transmission payload for the downlink transmission in accordance with the packet-group transmission mode, and transmitting, to the UE, the downlink transmission in accordance with the packet-group transmission mode.

A non-transitory computer-readable medium storing code for wireless communication at a base station is described. The code may include instructions executable by a processor to identify that a set of packets are scheduled for a downlink transmission to a UE via a packet-group transmission mode, determine one or more packets of the set of packets for inclusion in a transmission payload for the downlink transmission in accordance with the packet-group transmission mode, and transmit, to the UE, the downlink transmission in accordance with the packet-group transmission mode.

In some examples of the method, apparatuses, and non-transitory computer-readable medium described herein, the set of packets may be organized in one or more packet-groups.

In some examples of the method, apparatuses, and non-transitory computer-readable medium described herein, determining the one or more packets for inclusion in the transmission payload further may include operations, features, means, or instructions for determining the one or more packets such that all packets of at least one packet-group may be included in the transmission payload.

In some examples of the method, apparatuses, and non-transitory computer-readable medium described herein, determining the one or more packets for inclusion in the transmission payload further may include operations, features, means, or instructions for determining the one or more packets based on a resource amount allocated for the downlink transmission to the UE.

In some examples of the method, apparatuses, and non-transitory computer-readable medium described herein, determining the one or more packets for inclusion in the transmission payload further may include operations, features, means, or instructions for identifying a resource capacity for the transmission payload and determining the one or more packets such that the transmission payload comprises packets associated with a reduced quantity of packet-groups relative to a quantity of packet groups that the resource capacity supports.

In some examples of the method, apparatuses, and non-transitory computer-readable medium described herein, determining the one or more packets for inclusion in the transmission payload further may include operations, features, means, or instructions for identifying a resource capacity for the transmission payload and determining the one or more packets such that the transmission payload comprises packets associated with a reduced quantity of partial packet-groups relative to a quantity of partial packet groups that the resource capacity supports.

In some examples of the method, apparatuses, and non-transitory computer-readable medium described herein, determining the one or more packets for inclusion in the transmission payload further may include operations, features, means, or instructions for determining the one or more packets based on a packet-group information, where the one or more packets may be associated with a packet-group that corresponds to the packet-group information.

In some examples of the method, apparatuses, and non-transitory computer-readable medium described herein, the packet-group information corresponds to a packet-group type, a packet-group priority, a packet delivery deadline, or a combination thereof.

In some examples of the method, apparatuses, and non-transitory computer-readable medium described herein, transmitting the downlink transmission further may include operations, features, means, or instructions for transmitting the transmission payload for the downlink transmission such that the one or more packets may be selected in a non-first-in first-out order.

In some examples of the method, apparatuses, and non-transitory computer-readable medium described herein, determining the one or more packets for inclusion in the transmission payload further may include operations, features, means, or instructions for determining the one or more packets based on a file delay budget or a file error rate.

In some examples of the method, apparatuses, and non-transitory computer-readable medium described herein, the one or more packets may be associated as a file.

In some examples of the method, apparatuses, and non-transitory computer-readable medium described herein, the one or more packets may be associated with a same delivery deadline.

DETAILED DESCRIPTION

Figure 1:
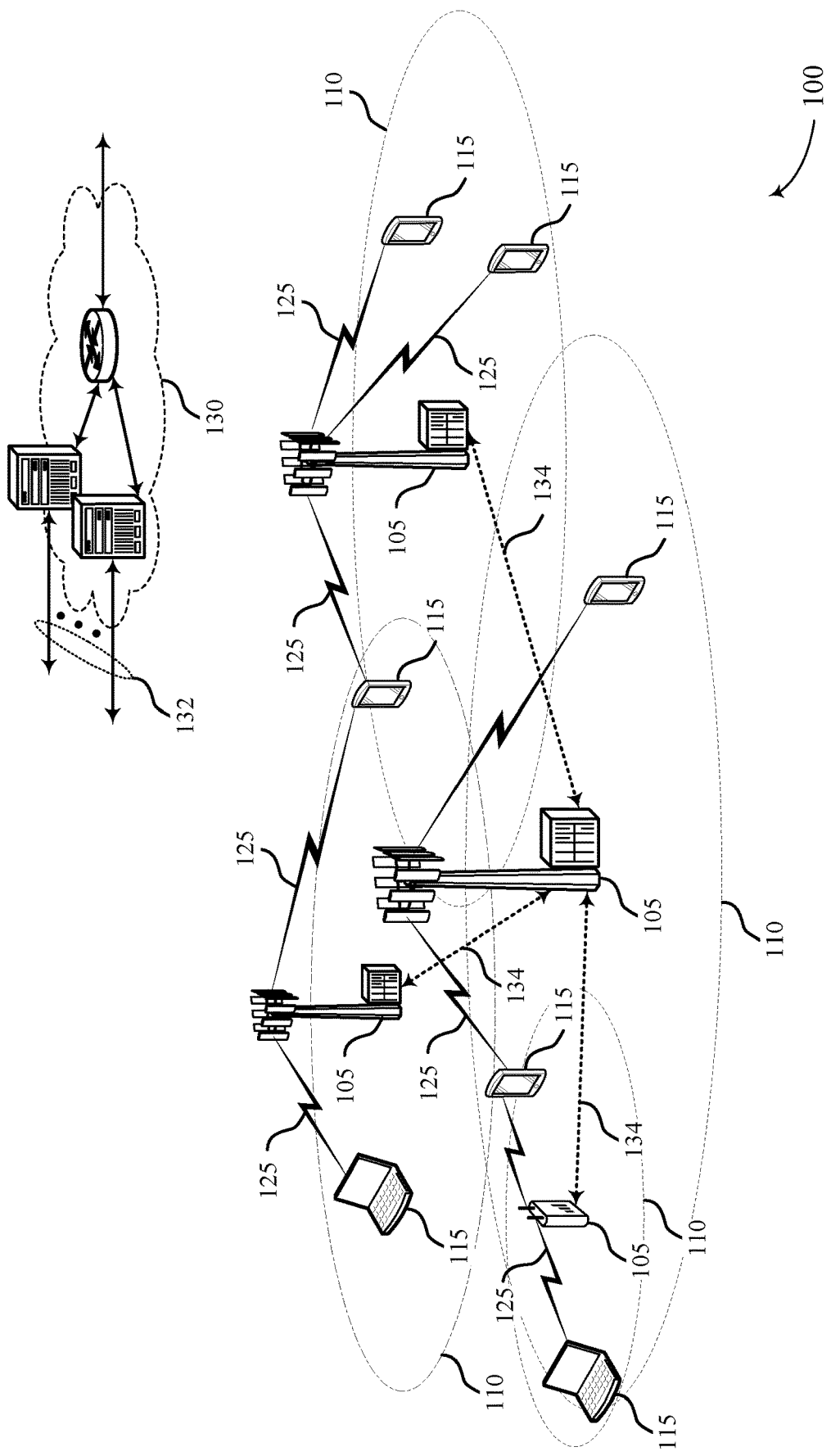
FIG. 1 illustrates an example of a system for wireless communications that supports traffic-aware grant signaling and processing in accordance with aspects of the present disclosure.

A user equipment (UE) in a wireless communications system, such as a New Radio (NR) system or a Long Term Evolution (LTE) system, may support applications associated with high throughput, high reliability, and low latency. In some cases, these applications may operate in extended reality (XR) environments. According to one or more aspects of the present disclosure, a base station may transmit an uplink grant to a UE (e.g., a UE implemented in an augmented reality (AR), virtual reality (VR), tablet, or smartphone system), and the uplink grant may include an indication of a packet transmission mode. For example, the uplink grant may indicate that an uplink transmission is to be transmitted using a packet-group transmission mode rather than a first-in first-out transmission mode (or some other default mode). Based on the packet-group transmission mode, the UE may determine one or more packets of a set of packets for uplink transmission. In the packet-group transmission mode, the UE may select a group of packets for transmission. In some examples, the group of packets may be associated with a file (e.g., including a plurality of packets). For example, each group of data packets may be associated with a video frame. Thus, rather than transmit packets using a first-in first-out technique, the UE may transmit a group of packets associated with a particular video frame.

In some cases, when determining which group of packets to include in a transmission payload, the UE (or base station, in some cases) may select a group of packets such that at least one packet-group (e.g., one file) is transmitted in the transmission payload. As such, if the uplink grant specifies enough transmission resources for three packets, then the UE may select them from a group comprised of three packets rather than a group comprised of four packets (which may result in splitting the group). In some implementations, the UE or base station may select the packets such that a transmission payload includes packets associated with a fewest or reduced quantity of packet-groups based on the capacity of the payload. Thus, rather than selecting multiple small packet-groups for transmission in a payload, the UE or base station may select a relatively large packet-group for transmission. In some cases, the UE selects packet-groups such that each transport block contains one packet-group. Other packet-group selection criterion may include a transmission priority, delivery deadline, modulation and coding scheme, etc.

Particular aspects of the subject matter described herein may be implemented to realize one or more advantages. The described techniques may support improvements in the file transmission framework, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are further described with respect to a wireless communications system, a packet scheduling system, and a process flow diagram. Aspects of the disclosure are further illustrated by and described with reference to apparatus diagrams, system diagrams, and flowcharts that relate to traffic-aware grant signaling and processing.

FIG. 1 illustrates an example of a wireless communications system 100 that supports traffic-aware grant signaling and processing in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Existing wireless communications systems may receive data packets as a stream of bits, and may assign the data packets to sub-protocol data units based on the received stream of bits. In some cases, the bits are grouped into packets, which may be transmitted on a first-in first-out basis. For some high throughput and low latency applications, it may be beneficial to group one or more transmitted packets as a file. As one example, packets in a video frame of an application may be included in a file, in which each file is associated with a separate video frame. As another example, each file may be associated with a portion of a video frame that can be separately processed by the application.

According to one or more aspects of the present disclosure, the wireless communications system 100 may be configured to group data packets of the same video frame as a file instead of in a first-in first-out manner. Additionally or alternatively, the wireless communications system 100 may be configured to select and transmit groups of data packets. For example, the base station 105 may transmit an uplink grant to the UE 115, where the uplink grant includes a transmission mode indication. In some cases, the transmission mode indication specifies a packet-group transmission mode or a first-in first-out transmission mode. According to the group transmission mode, UE 115 may determine one or more packets to transmit as a packet-group in a transmission payload according to the uplink grant. In some cases, the base station 105 may transmit packets to the UE 115 (e.g., downlink) using a packet-group transmission mode.

Thus, according to implementations, the UE 115 and base station 105 may transmit groups of data packets such that the data packets from the same group arrive at the destination at substantially the same time. In scenarios that require high throughput and reliability, the arrival of associated data packets (e.g., groups or files) within a same transport block may result in increased throughput and latency, because the receiving devices may be able to begin processing a complete file when the group is received (instead of waiting to receive multiple transport blocks carrying dispersed packets of a single file). For example, in XR communication environments, data files may represent video frames such as I-frames, and a device (e.g., base station 105 or UE 115 or supporting system such as a server) may process the frame or file to render additional graphics (e.g., AR or VR) or perform video frame predictions. As such, receipt of the file in one transmission payload or in consecutive payloads may result in faster processing and rendering, which may increase the operation and responsiveness of the XR system. Files may be examples of groups of packets that arrive from an upper layer in a burst or in the same time period, packets that have a header that include information that indicates that the packets are associated as a group or file, etc. Files may include packets that are configured to be processed together, or passed to an upper layer as part of the same protocol data unit or block.

Figure 2:
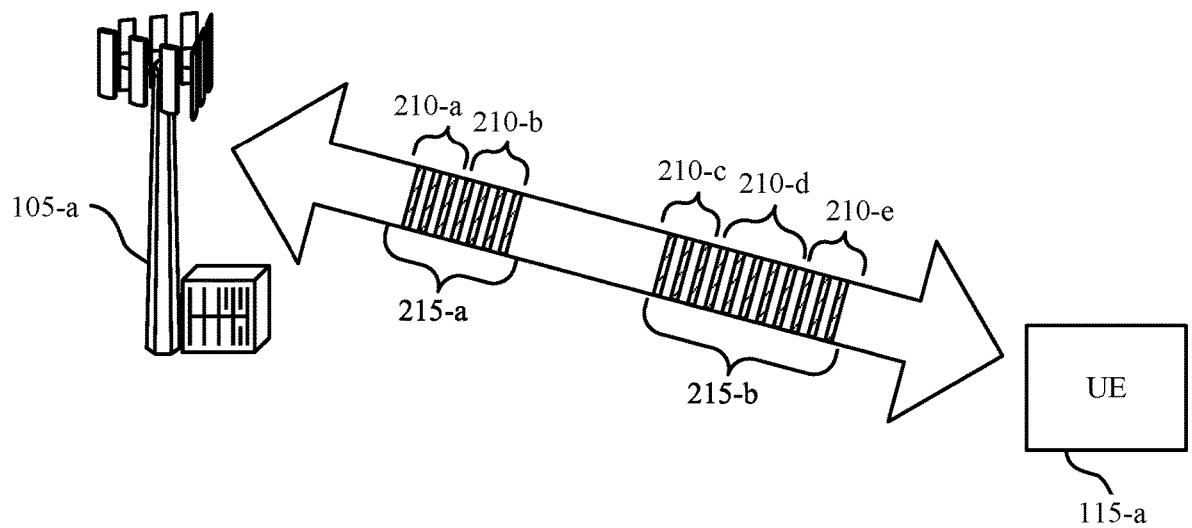
FIG. 2 illustrates an example of a wireless communications system that supports traffic-aware grant signaling and processing in accordance with aspects of the present disclosure.

FIG. 2 illustrates an example of a wireless communications system 200 that supports traffic-aware grant signaling and processing in accordance with aspects of the present disclosure. In some examples, wireless communications system 200 may implement aspects of wireless communications system 100. The wireless communications system may include a base station 105-a and a UE 115-a, which may be examples of the corresponding devices described with respect to FIG. 1. In one example, the base station 105-a may be referred to as a transmitter, and the UE 115-a may be referred to as a receiver. In some implementations, the UE 115-a and the base station 105-a may operate in a mmW spectrum and/or using NR technologies.

In some wireless systems (for example, NR wireless systems, such as wireless communications system 200) the UE 115-a and the base station 105-a may support low latency and high throughput communications. Different types of communications may entail different traffic thresholds. Table 1 represents a table showing the traffic thresholds for different types of traffic in a NR wireless system. For example, an NR wireless system, such as wireless communications system 200, may support eMBB applications, ultra-reliable low latency communications (URLLC), and XR communications. In some implementations, one or more XR applications (for example, applications using XR traffic thresholds) may include cloud reality applications, virtual reality applications, gaming applications, and the like. As discussed herein, XR applications are associated with high throughput (for example, throughput for rendering videos) and low latency. In some implementations, XR applications may include interactive video sessions (such as gaming or head mounted display). As described with reference to Table 1, XR applications may be associated with a packet delay budget and a packet error rate. For example, an XR application may be associated with a packet delay budget of 10 ms and a packet error rate of $10^{-6}$.

TABLE 1

| Traffic Type | 5QI Value | Packet Delay Budget | Packet Error | Default Maximum Data Burst Volume | Example Services |
|---|---|---|---|---|---|
| eMBB | 1 | 100 ms | $10^{-2}$ | N/A | Conversational voice |
| eMBB | 2 | 150 ms | $10^{-3}$ | N/A | Conversational video (for example, live streaming) |
| eMBB | 6, 8, 9 | 300 ms | $10^{-6}$ | N/A | Video (for example, buffered streaming) Transmission Control Protocol-based service (for example, e-mail, chat, file transfer protocol, peer-to-peer file sharing, progressive video) |
| ... | ... | ... | ... | ... | ... |
| XR | 80 | 10 ms | $10^{-6}$ | N/A | Low latency eMBB applications (such as augmented reality) |
| URLLC | 81 | 5 ms | $10^{-5}$ | 160 B | Remote control |
| ... | ... | ... | ... | ... | ... |

Additionally, Table 2 illustrates multiple use cases for XR applications. For example, an XR application may include virtual reality split rendering (for example, gaming applications). In such implementations, a head mounted display may communicate with a server that renders a video frame. In such examples, processing of the video frame may be performed at the server. Upon successful processing of the video frame, a communication link (such as a 5G communication link) may convey the processed video frame from the server to the head mounted display. For successful delivery of the processed video frame, 5G communication link may be associated with high throughput and low latency (for example, traffic threshold for XR applications). A second use case for XR applications may include augmented reality split computation. In augmented reality applications, an entire view of a user may not be covered by a rendered video. Instead, a rendered video (such as, video rendered from a server) may be augmented over a display of a user device (for example, a camera feed). A third use case for XR applications may include cloud gaming. In some examples, cloud gaming may be associated with high throughput and low latency communication link. Thus, XR applications may be subjected to higher traffic thresholds, and it may be beneficial for the NR wireless communications system (such as wireless communications system 200) to be aware of traffic associated with XR applications.

TABLE 2

|  | Virtual Reality split rendering | Augmented Reality split computation | Cloud Gaming |
| --- | --- | --- | --- |
| Head Mounted Display/Device | Head-mounted with 5G modem attached | Head-mounted with USB/Bluetooth connection to "Puck" or Smartphone with 5G modem | 5G Smartphone or Tablet |
| 5G usage | QoS | QoS | OTT/QoS |
| Location | Enterprise-Indoor, Residential-Indoor, Outdoor | Enterprise-Indoor, Outdoor | Outdoor |
| Mobility | Limited to head movements and restricted body movements, Hi-speed (VR in the back of a car) | Pedestrian, Hi-speed | Static, Hi-speed |

Existing wireless communications systems may be configured to treat data packets as a stream of bits without the knowledge of files associated with the packets. In some example XR applications, one or more transmitted packets may be in the form of groups or files. As one example, packets in a video frame in an XR application may be included in a file. In some examples, the separate files may be associated with a file error rate. For example, a file error rate may be based on a quantity of packets in each file, a reliability threshold associated with each file (for example, whether a file includes an I-frame or a P-frame), or a combination thereof. Existing wireless communications may not have a method to support or guarantee a file error rate.

To overcome the limitation of the existing wireless communications system, according to one or more aspects of the present disclosure, the wireless communications system 200 may be configured to group packets 205 of the same video frame as a file 210, and transmit the files 210 as packet-groups in uplink or downlink communications. In some cases, base station 105-a may transmit an uplink grant to UE 115-a. The uplink grant may indicate a transmission mode, such as a first-in first-out mode or a packet-group transmission mode. The UE 115 may select one or more packets 205 for transmission in a payload according to the indicated transmission mode.

Traffic flow illustrated in FIG. 2 may include multiple Internet Protocol (IP) packets 205. In some implementations, NR wireless systems (such as the wireless communications system 100 supporting XR applications) may be configured to group one or more IP packets 205 into one or more files 210. The wireless communications system 200 may group the one or more IP packets 205 based on a reliability threshold, packet delivery deadline, etc. For example, a first group of packets (e.g., file 210-a) may be associated with an I-frame, and a second group of packets (e.g., file 210-b) may be associated with a P-frame. In such an example, the first group of packets may have a higher reliability threshold (such as high priority) than the second group of packets. Additionally or alternatively, the wireless communications system may group the one or more IP packets 205 based on a delivery deadline associated with each IP packet 205. In some implementations, a delivery deadline of a packet 205 may be interpreted as a sum of a time of arrival of the packet (for example, at a base station 105) and a packet delay budget associated with the packet. In some examples, a group of packets having a same (or similar) delivery deadline may be grouped together as one file 210. In some examples, the wireless communications system 200 may implement additional signaling to convey information related to a delivery deadline and/or a packet delay budget from an application to base station 105 and the UE 115. In some implementations, the wireless communications system may group the one or more IP packets 205 based on a policy of file handling. For example, the wireless communications system may include one or more IP packets 205 in a file if the file (such as a video frame) is usable at a receiver (such as UE 115) when all IP packets of a file 210 are successfully received. In some examples, the wireless communications system may include one or more IP packets 205 in a file if the policy indicates that a continuous stream of IP packets 205 up to the first packet in error can be used at the receiver.

In the example of FIG. 2, the wireless communications system 200 generates 5 files. In some implementations, each file may include a set of IP packets 205 jointly processed by an application (such as an XR application). In some examples, the wireless communications system 200 may determine the IP packets 205 associated with a file based on a maximum transmission unit (MTU) setting on an IP stack interfacing with the application. In some examples, the wireless communications system may further fragment the IP packets 205 into smaller IP packet fragments. In some implementations, a burst 215 of files may be referred to as files generated by an application at the same (or similar) time. As depicted in the example of FIG. 2, the wireless communications system generates files 210-a and 210-b at a same (or similar) time. Accordingly, files 210-a and 210-b are included in a first burst 215-a (in uplink) of the traffic flow. Similarly, the UE 115-a (for example, an XR application included in the wireless communications system) may generate a second burst 215-b including files 210-c, 210-d, and 210-e.

In a packet-group transmission mode, the UE 115-a may consider various selection criterion when selecting packets 205 for transmission. In some example cases, the base station 105 may signal or otherwise indicate the selection criterion for the UE 115-a to consider when selecting packets under the packet-group transmission mode. For example, the UE 115 may select groups of packets based on an amount of resources available for the uplink grant (e.g., select the largest group), or the UE 115-a may determine the packets such that each packet of at least one packet-group is transmitted. In some examples, the UE 115-a may determine the packets or a packet-group such that the highest priority (or highest priority that may be allocated to the granted resources) is selected. The priority may correspond to a delivery deadline associated with the packets or group of packets. In some cases, the uplink grant may indicate multiple transport blocks, and the UE 115-*a* may select groups of packets such that each transport block includes one packet-group. In some cases, the grant may indicate a group quantity limitation, which indicates the maximum quantity of groups to be included in the transmission payload. In such cases, the UE 115-*a* may select packet-groups based on the limitation. It should be understood that the same or similar packet or packet-group selection criterion may be utilized by base station 105-*a* in a downlink scenario.

Figure 3:
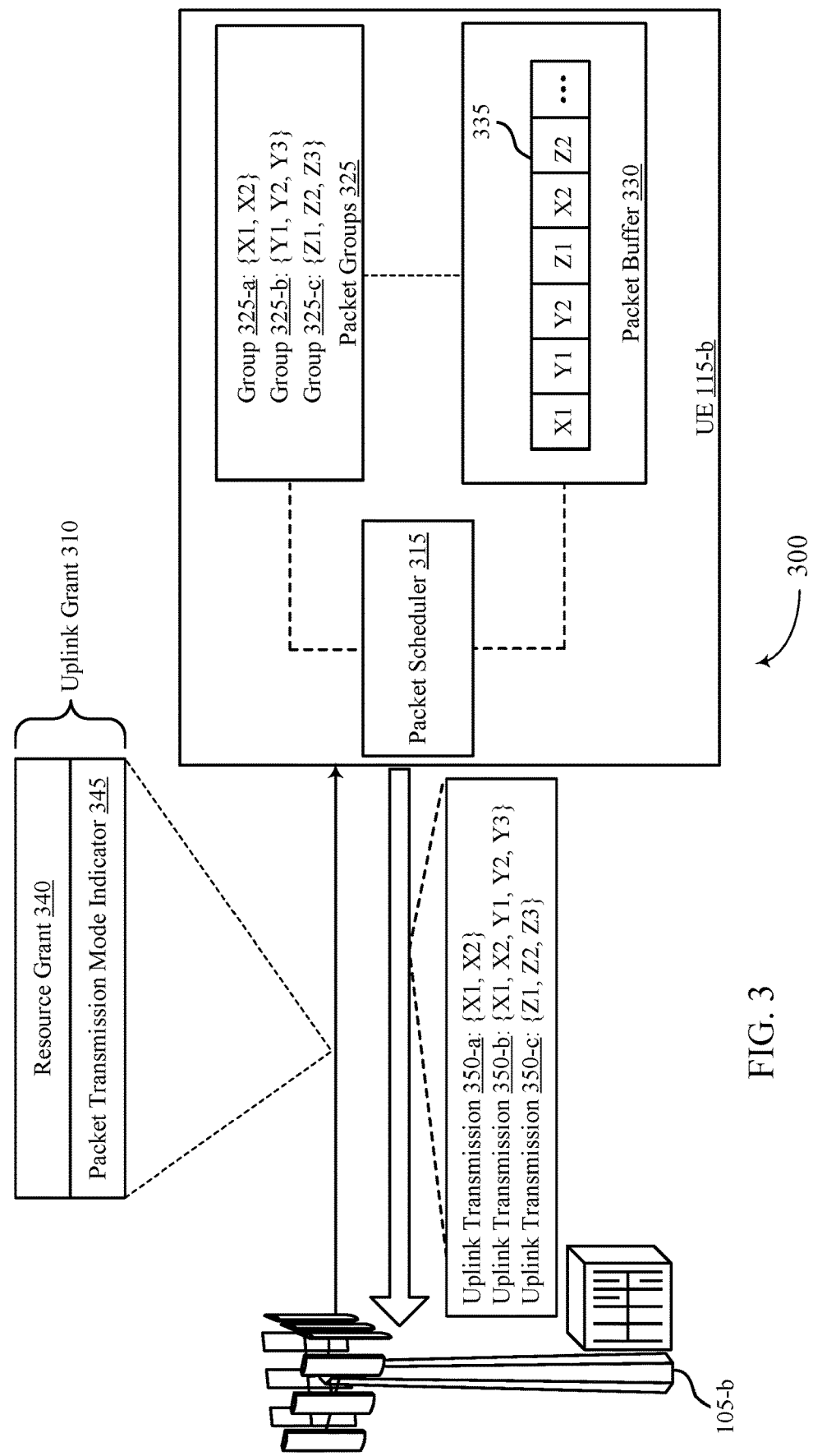
FIG. 3 illustrates an example of a packet scheduling system that supports traffic-aware grant signaling and processing in accordance with aspects of the present disclosure.

FIG. 3 illustrates an example of a packet scheduling system 300 that supports traffic-aware grant signaling and processing in accordance with aspects of the present disclosure. In some examples, packet scheduling system 300 may implement aspects of wireless communications system 100 and 200. Packet scheduling system 300 includes a base station 105-*b* and a UE 115-*b*, which may be examples of the base station 105 and UE 115 of FIGS. 1 and 2.

The base station 105-*b* transmits an uplink grant 310 to the UE 115-*b*. The resource grant 340 may include a resource grant 340 and a packet transmission mode indicator 345. The resource grant 340 may indicate a resource schedule that may be utilized for uplink transmissions by the UE 115-*b* to the base station 105-*b*. The packet transmission mode indicator 345 may indicate one of a first-in first-out transmission mode or a packet-group transmission mode.

The UE 115-*b* includes a packet scheduler 315, which may be an example of aspects of the communications manager as described with respect to FIGS. 5 through 8. The packet scheduler 315 may select one or more packets of a packet buffer 330 for uplink transmission to the base station 105-*b* according to the uplink grant 310. If the packet transmission mode indicator 345 indicates a default mode (e.g., a first-in first-out mode), then the packet scheduler 315 may determine to transmit the packets according to a first-in first-out queue 335. The first-in first-out queue 335 may store packets in an order by which they are received or generated (e.g., by an XR application supported by the UE 115-*b*). In first-in first-out mode, the packet scheduler 315 may select the first one or more packets in the queue for transmission according to the resource grant 340. For example, if the resource grant 340 indicates enough resources (e.g., a resource capacity) for three packets to be transmitted in an uplink transmission, then the packet scheduler 315 may select packets X1, Y1, and Y2 according to the first-in first-out queue 335, even though these packets are associated with different files or packet-groups.

In a packet-group transmission mode, the packet scheduler 315 may select packets according to packet-groups 325. The packets may be grouped by applications that generate or cause generation of the packets. In some cases, a packet-group 325 generated by an application may include packets associated with the same delivery deadline, which may be equal to the time of arrival of a packet plus the delay budget of the file in which the packet belongs. According to the packet-group transmission mode, the UE 115-*b* may determine to transmit bits in a manner that allows a group to be mapped to a single transport block (e.g., granted by the resource grant 340). In some cases, this technique results in a non-first-in first-out order. For example, packet-group 325-*a* includes packets X1 and X2; packet-group 325-*b* includes packets Y1, Y2, and Y3; and packet-group 325-*c* includes packets Z1, Z2, and Z3. The packets may be ordered in queue 335 as illustrated. If the grant allows the transmission of two packets, then the UE 115-*b* may select group 325-*a* {X1, X2} for uplink transmission 350-*a*. However, if the grant allows transmission of five packets, then the UE 115-*b* may select groups 325-*a* {X1, X2} and 325-*b* {Y1, Y2, Y3}, for example, for uplink transmission 350-*b*. In another example, if the grant allows transmission of three packets (e.g., based on the resource capacity allocated by the grant), then the UE 115-*b* may select group 325-*c* {Z1, Z2, Z3} for uplink transmission 350-*c*. This technique may ensure that an entire group is transmitted within a single transport block, which may result in reliable file or packet-group processing. Stated differently, the transmission may occur such that the transport block includes packets from as few groups as possible while still ensuring efficient utilization of the allocated resource capacity, such that packet-groups are not split between transport blocks.

In some examples, the base station 105-*b* may configure the UE 115-*b* with a capacity condition (e.g., using RRC, DCI, MAC-CE or another type of signaling). In other examples, the capacity condition may be predefined at the UE 115-*b*. The capacity condition may specify a percentage or other metric of the capacity to be used by the selected packets. As such, if the UE 115-*b* is configured to select the packets to reduce the quantity of packet groups (e.g., select groups with a larger quantity of packets first in attempt to fill the resource capacity allocated by the grant). Once the larger packet groups are selected, the UE 115-*b* may attempt to fill the remaining capacity with complete packet groups. If however, another group does not fill the remaining capacity, the UE 115-*b* may or may not select a portion of a group. If a portion of a group is not selected, then the UE 115-*a* may determine whether the selected group(s) satisfy the capacity condition. For example, the capacity condition may specify that at least 95% of the capacity allocated by the grant is to be used. Thus, if the larger group(s) do not satisfy the condition, then the UE 115-*b* may select packets of other group(s) for the payload. Thus, the UE 115-*b* selects packets in order to reduce the quantity of packet groups transmitted (e.g., select larger groups) while also ensuring that the resource capacity may be efficiently utilized.

In some cases, if the resource grant 340 indicates multiple transport blocks, then the packets may be mapped to transport blocks such that each transport block includes packets from the same group to the extent possible. This technique may provide that a failure or delay (e.g., due to retransmission) of the transport block impacts as few packet-groups as possible at upper layers of the UE 115-*b* (or base station 105). In some cases, the packet scheduler 315 may consider the priority of groups when selecting packets for uplink transmission 350. As noted above, if the grant allows for transmission of three packets, then the packet scheduler 315 may select the higher priority between groups 325-*b* and 325-*c*. In some examples, the packet scheduler 315 may prioritize a first packet-group (e.g., packet-group 325-*a*) with less packets than a second group (e.g., packet-group 325-*b*) when the grant allows for transmission of the packet-group with more packets. Further, the packet scheduler 315 may select lower priority groups for transport blocks with high efficiency modulation coding schemes, or select high priority groups with better reliability due to use of lower efficiency modulation coding schemes.

In some implementations, the UE 115-*b* (e.g., the packet scheduler 315) may consider packet-grouping information when selecting groups for transmission in a packet-group transmission mode. In some cases, the uplink grant 310 may specify which packet-group to which the grant is applicable. For example, the grant may specify that the resource grant 340 may be utilized for a packet-group type, a packet-group priority, etc. For example, the grant may specify that the resources are to be used by an I-frame. In another example, the grant may specify that the resource may be used by groups having a priority (e.g., delivery deadline or other priority indication) above a threshold level. In some cases, the threshold may be dynamic based on the quantity of groups or packets.

These example packet selection criteria may be applicable in a downlink scenario. For example, base station 105-*b* may determine packet-groups based on available downlink resources, priorities associated with groups, etc. In some cases, the base station 105 may convey a file delay budget to the UE 115-*b* in the uplink grant 310. The UE 115-*b* may be aware of the packet delay budget and packet error rate, which may be extended for a file, flow, or group of packets. In some example implementations, the UE 115 may determine to utilize a group-packet transmission mode even when the grant 310 does not include an indicator. For example, the base station 105-*b* may be configured to expect packet-group transmission mode from the UE 115 based on an identifier of the UE 115. Further, the UE 115-*b* may autonomously select packet-group transmission mode based on types of packets generated (e.g., I-frame packets), the quantity of groups, etc.

Figure 4:
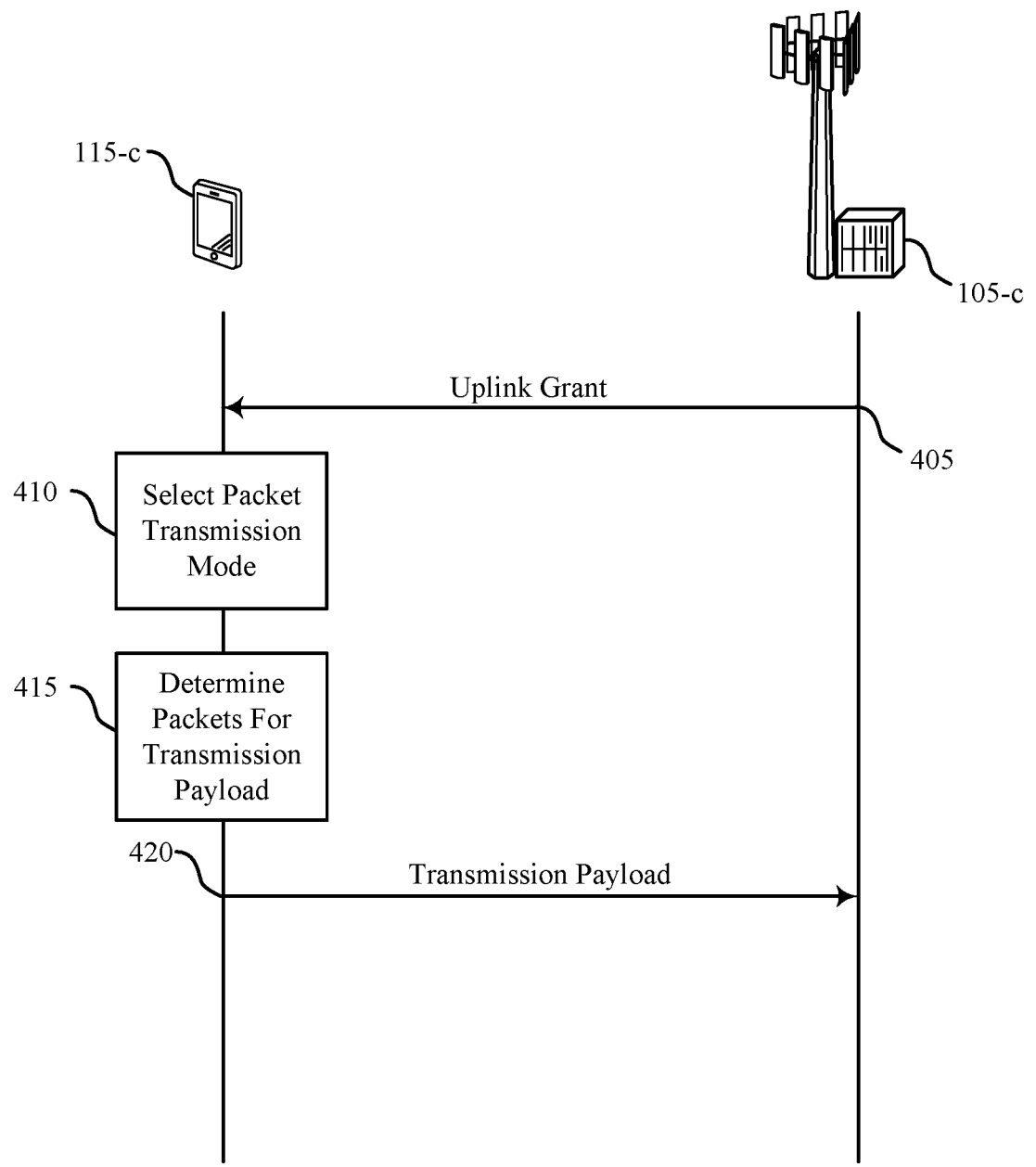
FIG. 4 illustrates an example of a process flow diagram that supports traffic-aware grant signaling and processing in accordance with aspects of the present disclosure.

FIG. 4 illustrates an example of a process flow 400 that supports traffic-aware grant signaling and processing in accordance with aspects of the present disclosure. In some examples, process flow 400 may implement aspects of wireless communications system 100. The process flow 400 may include a base station 105-*c* and a UE 115-*c*, which may be examples of the corresponding base stations 105 and UEs 115 in FIGS. 1 through 3.

At 405, the base station 105-*c* transmits an uplink grant to UE 115-*c* for an uplink transmission from the UE 115-*c* to the base station 105-*c*. The uplink grant may include an indication of a resource capacity and an indication of a packet transmission mode. In some cases, the uplink grant includes a packet-group selection criterion.

At 410, the UE 115-*c* may select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission.

At 415, the UE 115-*c* determines one or more packets of a plurality of packets (e.g., stored in a buffer) for inclusion in a transmission payload for the uplink transmission in accordance with the uplink grant and based at least in part on the selected packet transmission mode. In some cases, when the uplink grant includes a packet transmission mode indicator specifying the packet-group transmission mode, the determined one or more packets may be a packet-group. In some cases, the one or more packets are determined such that at least one packet-group is included in the transmission payload. Other criterion may be considered, such as priorities associated with a group, the resource amount indicated by the grant, a reduced quantity of packet-groups, a reduced quantity of partial packet groups, packet-group type (e.g., an I-frame group), one packet-group per transport block, a group quantity limitation, a modulated coding scheme associated with a transport block, etc.

At 420, the UE 115-*c* transmits the uplink transmission in accordance with the packet transmission mode and the uplink grant to the base station 105-*c*. In some cases, the transmission results in packets being transmitted in a non-first-in first-out order. In the case of the packet-group transmission mode, the base station may process the one or more groups of packets in accordance with the mode. The processing may include passing the packets in each of the one or more groups to an upper layer (e.g., an application layer) as one or more protocol data units (PDUs). That is, the PDUs may be passed to the higher layer as a block.

Figure 5:
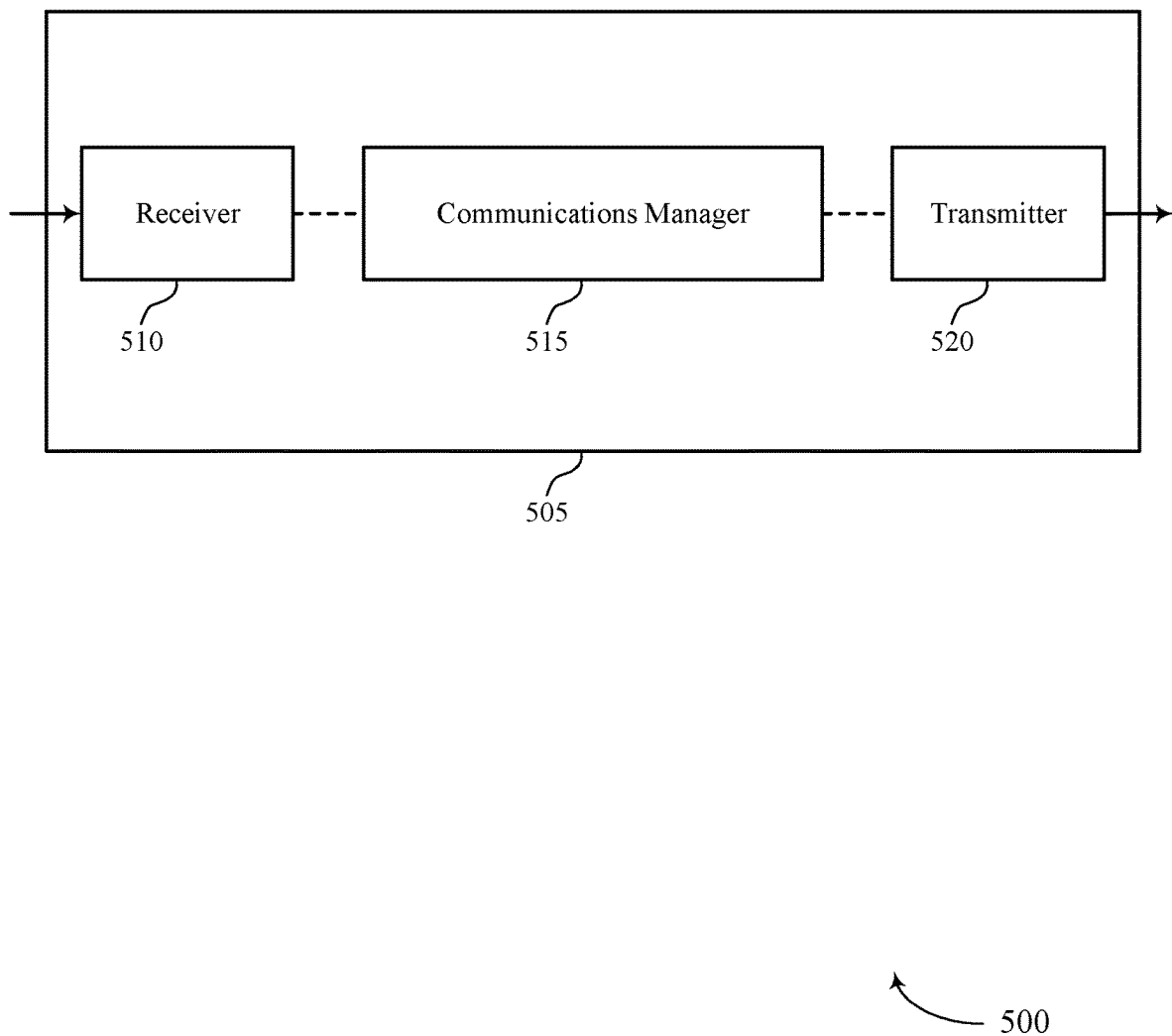
FIGS. 5 and 6 show block diagrams of devices that support traffic-aware grant signaling and processing in accordance with aspects of the present disclosure.

FIG. 5 shows a block diagram 500 of a device 505 that supports traffic-aware grant signaling and processing in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to traffic-aware grant signaling and processing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, an uplink grant for an uplink transmission from the UE to the base station, select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission, determine one or more packets of a set of packets for inclusion in the transmission payload for the uplink transmission in accordance with the uplink grant and based on the selected packet transmission mode, and transmit, to the base station, the uplink transmission in accordance with the packet transmission mode and the uplink grant. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

One implementation includes receiving, from a base station, an uplink grant for an uplink transmission from the UE to the base station, identifying, based on the uplink grant, a packet transmission mode for the uplink transmission is to be transmitted using a default transmission mode or a packet-group transmission mode, determining one or more packets of a plurality of packets for inclusion in a transmission payload for the uplink transmission in accordance with the uplink grant and based on the selected packet transmission mode, and transmitting, to the base station, the uplink transmission in accordance with the packet transmission mode and the uplink grant. This implementation may provide one or more potential advantages by allowing a device 505 to save power and increase battery life by avoiding having to retransmit packets from various different groups based on a packet loss. For example, the device 505 may transmit a packet group or file in one or more consecutive transmission payload such as to increase the probability that the file is received in the same or similar time period. A failed transport block may have a limited impact in terms of how may files (e.g., groups) have to wait for the TB to succeed. This may improve the overall latency in communication, thus resulting in improved battery life.

Based on receiving a packet transmission mode, a processor of the device 505 may efficiently determine resources for transmitting packets and avoid wasting resources for packet retransmission. For example, in some cases, a file may be used when the packets of a file are received. Accordingly, using the packet-group transmission mode increases the probability that all of the packets of a file are received, thereby reducing processing additional packet for retransmission due to packet loss or failure. Further, the processor of the UE 115 may turn on one or more processing units for processing packets for transmission based on the selected packet transmission mode, increasing a processing clock, or other similar mechanism within the device 505. As such, when the indicator is received, the processor may be ready to respond more efficiently through the reduction of ramp up in processing power.

Further, as noted, an advantage of using the packet-group transmission mode, the packets may be organized into groups based on the application that generated or caused generation of the packets, or based on the packet delivery deadline. Transmission of the packets as the groups may ensure that the packets are delivered on time, thereby reducing packet retransmission. This may result power saving and increased battery life in a device 505 and processor resource savings by reduction of retransmissions. Similarly, the device 505 may ensure that at least one group is transmitted, thereby increasing the probability that the at least one group is received by the receiving device. Thus, failure or delay due to retransmission of a transport block impacts as few packet groups as possible, resulting in increased battery life and processor resource savings and reduced latency.

In some cases, the packet-group transmission mode results in the device 505 selecting packet groups such that the largest group is selected for an amount of resources indicated by an uplink grant. This increases resource efficiency at the device and may result in the processor not having to utilize processing resources retransmitting or splitting a packet-group into multiple transmission payloads. In some cases, an advantage of determining the packet groups such that the transmission payload comprises packets associated with a reduced quantity of packet groups results in a reduction of impact due to delay or failure due to retransmission. Stated differently, failure due to retransmission may impact as few packet groups as possible.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
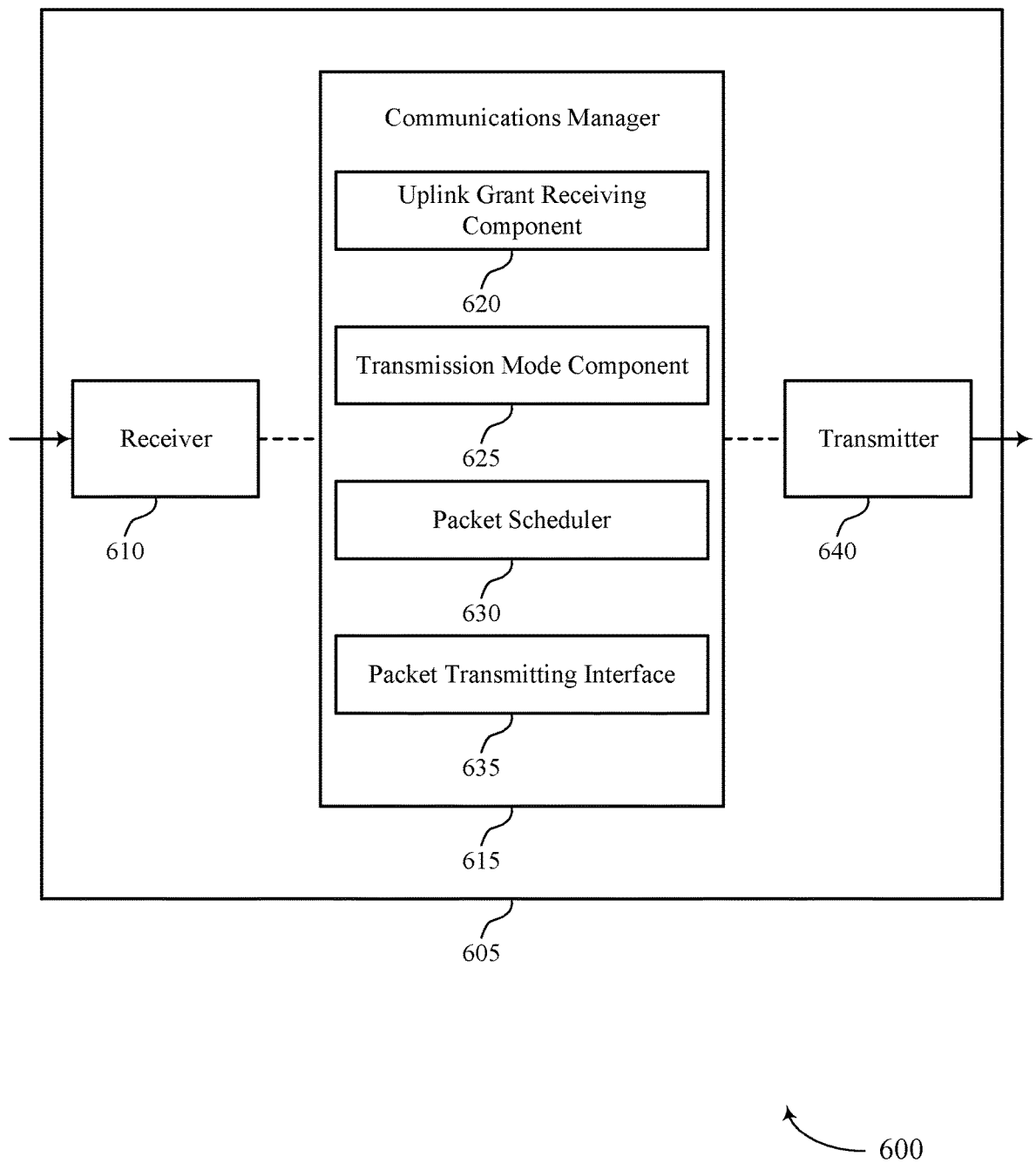

FIG. 6 shows a block diagram 600 of a device 605 that supports traffic-aware grant signaling and processing in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to traffic-aware grant signaling and processing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an uplink grant receiving component 620, a transmission mode component 625, a packet scheduler 630, and a packet transmitting interface 635. The communications manager 615 may be an example of aspects of the communications manager 810 described herein.

The uplink grant receiving component 620 may receive, from a base station, an uplink grant for an uplink transmission from the UE to the base station. The transmission mode component 625 may select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission.

The packet scheduler 630 may determine one or more packets of a set of packets for inclusion in the transmission payload for the uplink transmission in accordance with the uplink grant and based on the selected packet transmission mode. The packet transmitting interface 635 may transmit, to the base station, the uplink transmission in accordance with the packet transmission mode and the uplink grant.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
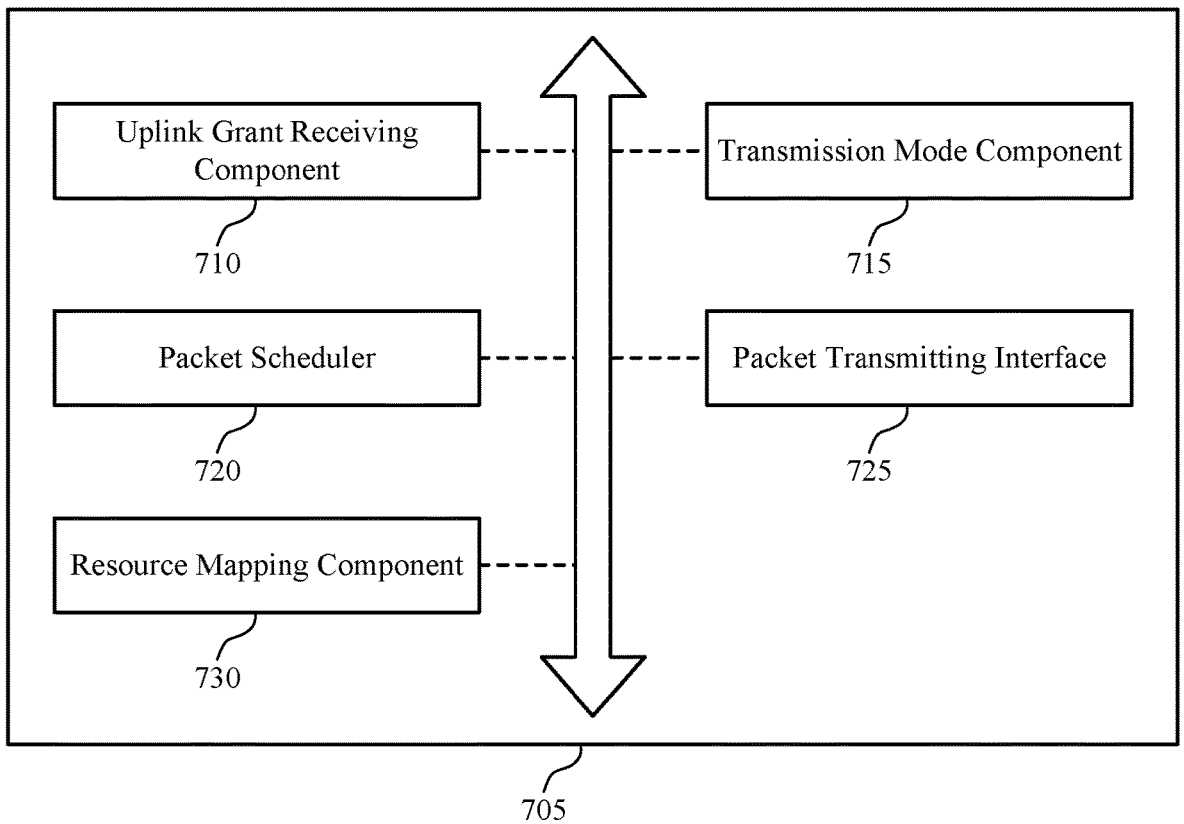
FIG. 7 shows a block diagram of a communications manager that supports traffic-aware grant signaling and processing in accordance with aspects of the present disclosure.

FIG. 7 shows a block diagram 700 of a communications manager 705 that supports traffic-aware grant signaling and processing in accordance with aspects of the present disclosure. The communications manager 705 may be an example of aspects of a communications manager 515, a communications manager 615, or a communications manager 810 described herein. The communications manager 705 may include an uplink grant receiving component 710, a transmission mode component 715, a packet scheduler 720, a packet transmitting interface 725, and a resource mapping component 730. Each of these modules may communicate, directly or indirectly, with one another (e.g., via one or more buses).

The uplink grant receiving component 710 may receive, from a base station, an uplink grant for an uplink transmission from the UE to the base station. In some examples, the uplink grant receiving component 710 may receive, from the base station, an indication of a file delay budget or a file error rate.

The transmission mode component 715 may select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission. In some examples, the transmission mode component 715 may identify that the uplink grant includes a packet transmission mode indicator specifying the packet-group transmission mode, where the set of packets are organized in one or more packet-groups. The transmission mode component 715 may receive, from the base station, an indication of a capacity condition, where the one or more packets are determined based at least in part on satisfaction of the capacity condition The packet scheduler 720 may determine one or more packets of a set of packets for inclusion in the transmission payload for the uplink transmission in accordance with the uplink grant and based on the selected packet transmission mode. In some examples, the packet scheduler 720 may determine the one or more packets such that all packets of at least one packet-group are included in the transmission payload. In some examples, the packet scheduler 720 may determine the one or more packets based on a resource capacity indicated by the uplink grant. In some examples, determining the one or more packets such that the transmission payload includes packets associated with a reduced quantity of packet-groups relative to a quantity of packet groups that the resource capacity supports and based at least in part on the transmission payload satisfying a capacity condition. In some examples, the packet scheduler 720 may determine the one or more packets based on a resource capacity indicated by the uplink grant. In some examples, determining the one or more packets such that the transmission payload includes packets associated with a reduced quantity of partial packet-groups relative to a quantity of partial packet groups that the resource capacity supports and based at least in part on the transmission payload satisfying a capacity condition.

In some examples, the packet scheduler 720 may determine the one or more packets based on a group selection criterion indicated by the uplink grant. In some examples, the packet scheduler 720 may determine the one or more packets based on a group quantity limitation indicated by the uplink grant, the group quantity limitation indicating a maximum quantity of groups to be included in the transmission payload.

In some examples, the packet scheduler 720 may select the one or more packets based on a transmission priority associated with the one or more packet-groups. In some examples, the packet scheduler 720 may select the one or more packets based on a modulation coding scheme associated with a transport block (TB) indicated by the uplink grant. In some examples, the packet scheduler 720 may determine the one or more packets based on a packet-group information, where the one or more packets are associated with a packet-group that corresponds to the packet-group information.

In some examples, the packet scheduler 720 may determine the one or more packets based on the file delay budget or the file error rate. In some cases, the group selection criterion indicates a packet-group type criterion or a packet-group priority criterion. In some cases, the transmission priority is based on a delivery deadline associated with the one or more packet-groups. In some cases, the packet-group information corresponds to a packet-group type, a packet-group priority, a packet delivery deadline, or a combination thereof.

The packet transmitting interface 725 may transmit, to the base station, the uplink transmission in accordance with the packet transmission mode and the uplink grant. In some examples, the packet transmitting interface 725 may transmit the transmission payload for the uplink transmission such that the one or more packets are selected in a non-first-in first-out order.

The resource mapping component 730 may map the one or more packets to each of the multiple transport blocks such that packets associated with a same packet-group are mapped to a same transport block.

Figure 8:
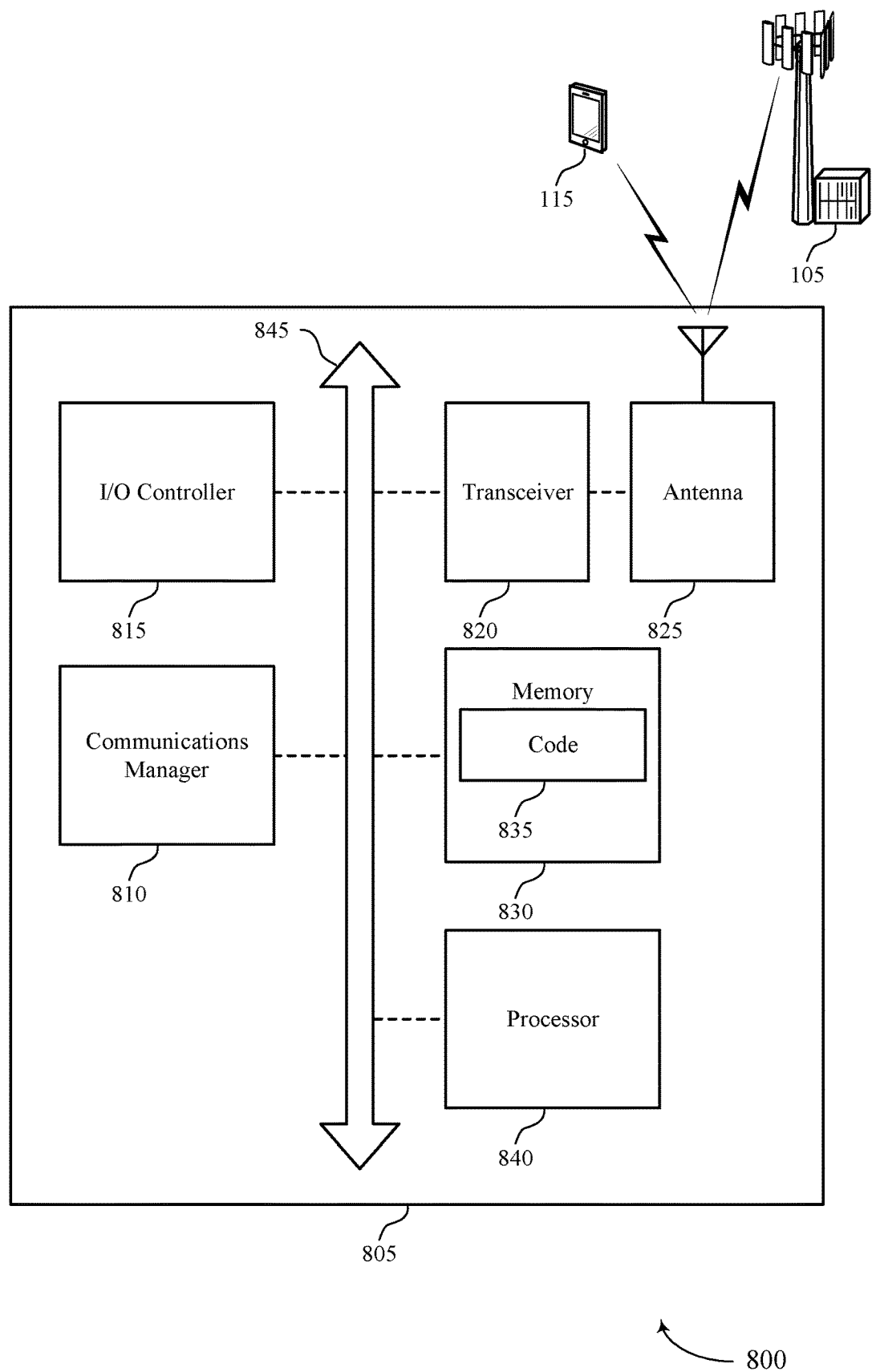
FIG. 8 shows a diagram of a system including a device that supports traffic-aware grant signaling and processing in accordance with aspects of the present disclosure.

FIG. 8 shows a diagram of a system 800 including a device 805 that supports traffic-aware grant signaling and processing in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, an uplink grant for an uplink transmission from the UE to the base station, select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission, determine one or more packets of a set of packets for inclusion in the transmission payload for the uplink transmission in accordance with the uplink grant and based on the selected packet transmission mode, and transmit, to the base station, the uplink transmission in accordance with the packet transmission mode and the uplink grant.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting traffic-aware grant signaling and processing).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
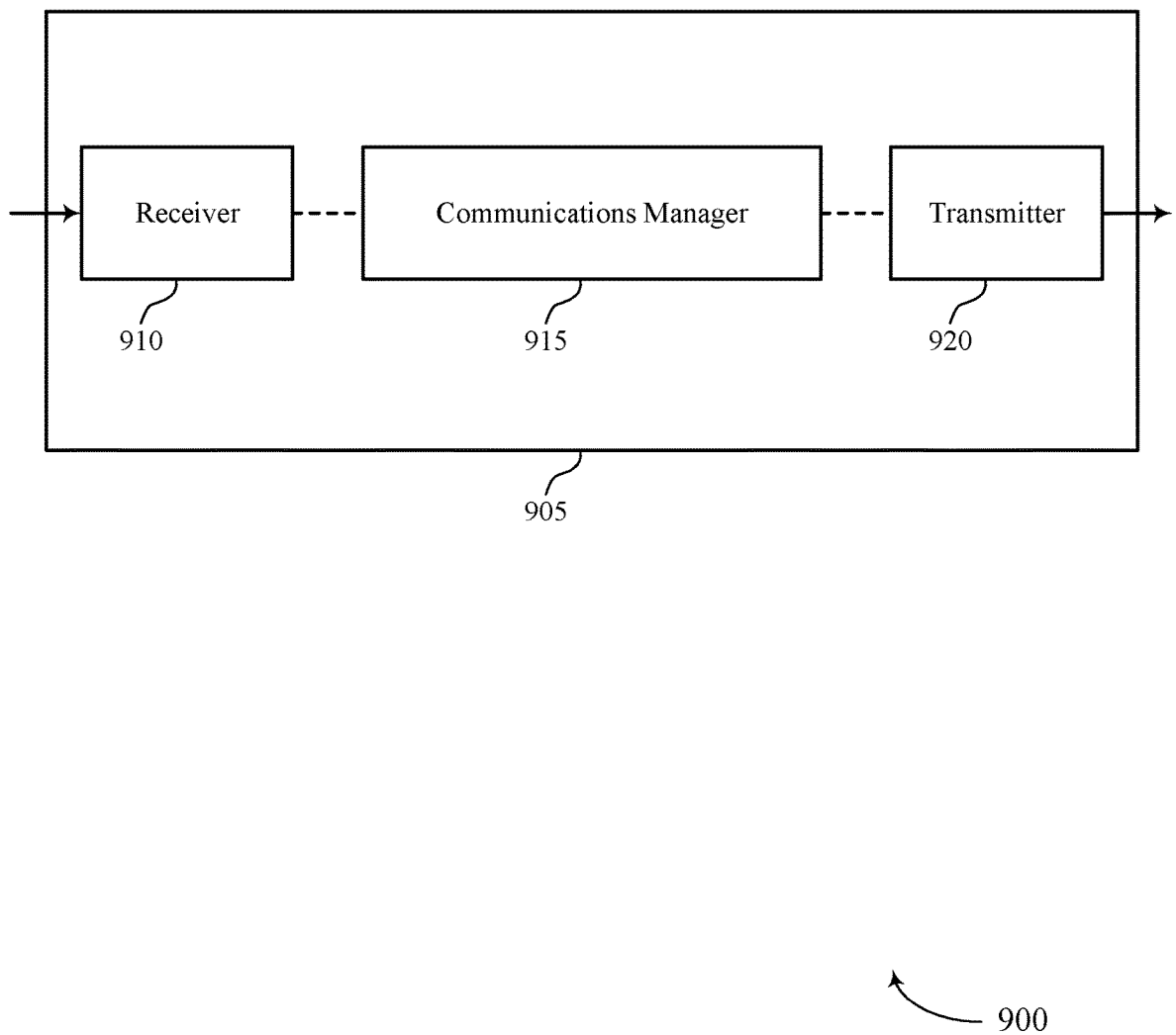
FIGS. 9 and 10 show block diagrams of devices that support traffic-aware grant signaling and processing in accordance with aspects of the present disclosure.

FIG. 9 shows a block diagram 900 of a device 905 that supports traffic-aware grant signaling and processing in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to traffic-aware grant signaling and processing, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, an uplink grant for an uplink transmission from the UE to the base station, where the uplink grant includes a packet transmission mode for the uplink transmission is to be transmitted using a default transmission mode or a packet-group transmission mode and receive the uplink transmission from the UE, the uplink transmission including a transmission payload including one or more packets in accordance with the uplink grant and the packet transmission mode. The communications manager 915 may also identify that a set of packets are scheduled for a downlink transmission to a UE via a packet-group transmission mode, determine one or more packets of the set of packets for inclusion in a transmission payload for the downlink transmission in accordance with the packet-group transmission mode, and transmit, to the UE, the downlink transmission in accordance with the packet-group transmission mode. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

One implementation includes transmitting, to a UE, an uplink grant for an uplink transmission from the UE to the base station, where the uplink grant includes a packet transmission mode for the uplink transmission is to be transmitted using a default transmission mode or a packet-group transmission mode and receiving the uplink transmission from the UE, the uplink transmission including a transmission payload including one or more packets in accordance with the uplink grant and the packet transmission mode. This implementation may provide one or more potential advantages by allowing a device 905 (e.g., a base station 105) to save resources by preparing resources in a group format, when necessary. This allows the base station 105 to communicate with a supporting server (e.g., XR server) such that the server is prepared to process a file (e.g., group of packets) for quicker processing and rendering. For example, the device 905 may transmit a packet group transmission mode indication to increase probability that a file is received at the device 905 in the same transmission payload or consecutive payloads. This may result in a reduction of transmission of a packet group (which may have the same delivery deadline).

Based on transmitting the transmission mode indication specifying a packet-group transmission mode, an advantage is that the device 905 may receive the packets organized in one or more groups. Because the packets are organized in one or more groups, the packets may be efficiently processed, thereby increasing reliability in the system and reducing utilizing of processing resources waiting on a retransmission from the transmitting device (e.g., a UE 115). In some cases, the device 905 may transmit the uplink grant with a resource capacity, which limits the quantity of packets included in the uplink transmission. This may result in advantages due to the uplink resources being efficiently used by one or more groups. In some cases, the uplink grant may specify a group selection criterion. The criterion may specify a packet-priority or packet-group type. This has advantages in increasing the probability that high priority groups (e.g., I-frames) are received, thereby saving processing resources for packet processing.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
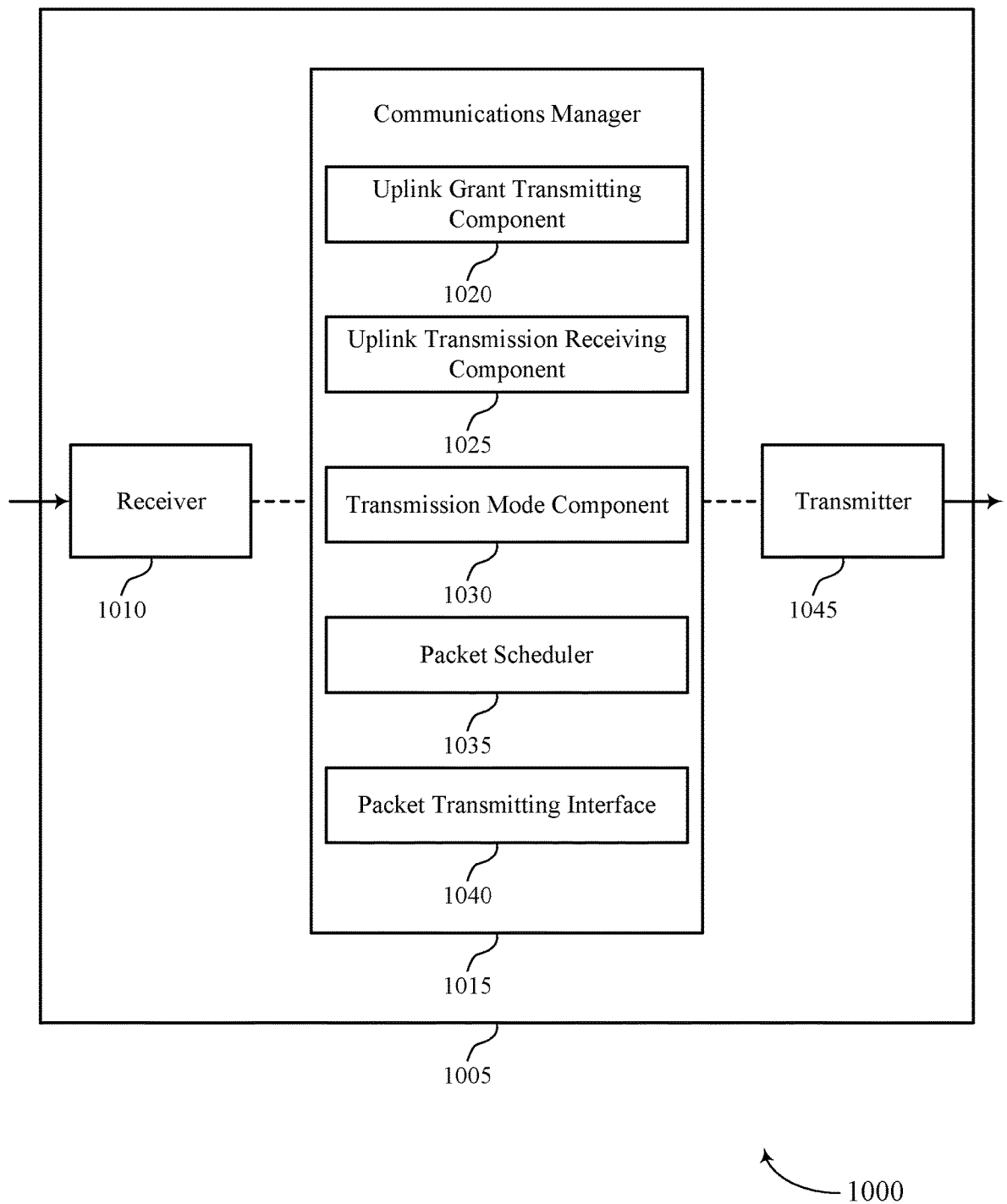

FIG. 10 shows a block diagram 1000 of a device 1005 that supports traffic-aware grant signaling and processing in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to traffic-aware grant signaling and processing, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink grant transmitting component 1020, an uplink transmission receiving component 1025, a transmission mode component 1030, a packet scheduler 1035, and a packet transmitting interface 1040. The communications manager 1015 may be an example of aspects of the communications manager 1210 described herein.

The uplink grant transmitting component 1020 may transmit, to a UE, an uplink grant for an uplink transmission from the UE to the base station, where the uplink grant includes a packet transmission mode for the uplink transmission is to be transmitted using a default transmission mode or a packet-group transmission mode.

The uplink transmission receiving component 1025 may receive the uplink transmission from the UE, the uplink transmission including a transmission payload including one or more packets in accordance with the uplink grant and the packet transmission mode.

The transmission mode component 1030 may identify that a set of packets are scheduled for a downlink transmission to a UE via a packet-group transmission mode. The packet scheduler 1035 may determine one or more packets of the set of packets for inclusion in a transmission payload for the downlink transmission in accordance with the packet-group transmission mode. The packet transmitting interface 1040 may transmit, to the UE, the downlink transmission in accordance with the packet-group transmission mode.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
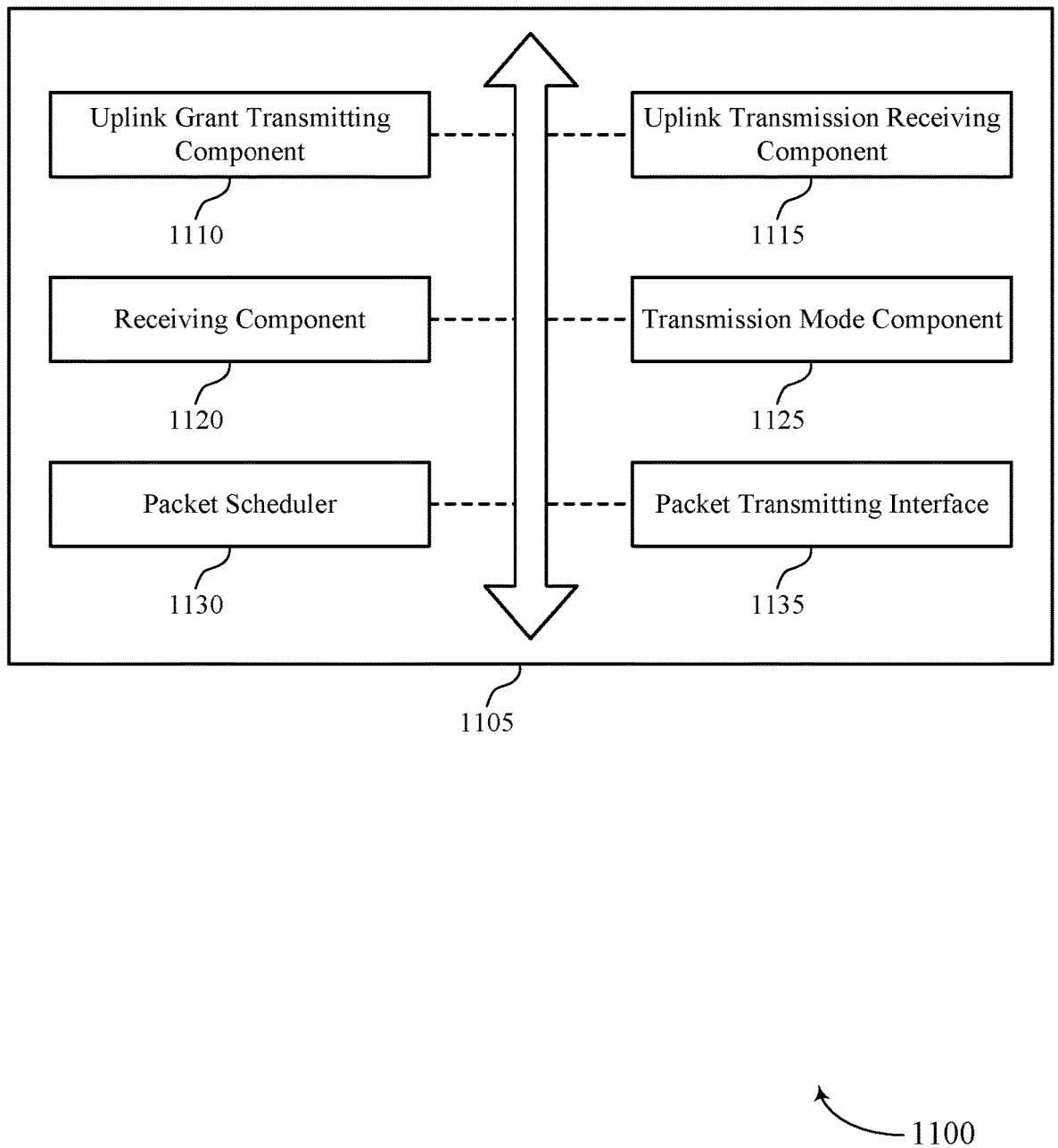
FIG. 11 shows a block diagram of a communications manager that supports traffic-aware grant signaling and processing in accordance with aspects of the present disclosure.

FIG. 11 shows a block diagram 1100 of a communications manager 1105 that supports traffic-aware grant signaling and processing in accordance with aspects of the present disclosure. The communications manager 1105 may be an example of aspects of a communications manager 915, a communications manager 1015, or a communications manager 1210 described herein. The communications manager 1105 may include an uplink grant transmitting component 1110, an uplink transmission receiving component 1115, a receiving component 1120, a transmission mode component 1125, a packet scheduler 1130, and a packet transmitting interface 1135. Each of these modules may communicate, directly or indirectly, with one another (e.g., via one or more buses).

The uplink grant transmitting component 1110 may transmit, to a UE, an uplink grant for an uplink transmission from the UE to the base station, where the uplink grant includes a packet transmission mode for the uplink transmission is to be transmitted using a default transmission mode or a packet-group transmission mode.

In some examples, the uplink grant transmitting component 1110 may transmit an indication of a resource amount limiting a quantity of packets to be included in the uplink transmission.

In some examples, the uplink grant transmitting component 1110 may transmit a group selection criterion in the uplink grant when the uplink grant includes a packet transmission mode specifies the packet-group transmission mode. In some examples, the uplink grant transmitting component 1110 may transmit an indication of a file delay budget or a file delay error rate. In some cases, the group selection criterion indicates a packet-group type criterion or a packet-group priority criterion. In some cases, the packet-group priority criterion is based on a delivery deadline associated with one or more packet-groups.

The uplink transmission receiving component 1115 may receive the uplink transmission from the UE, the uplink transmission including a transmission payload including one or more packets in accordance with the uplink grant and the packet transmission mode. In some examples, the uplink transmission receiving component 1115 may receive the one or more packets mapped to each of multiple transport blocks such that packets associated with a same packet-group are mapped to a same transport block, where the uplink grant is for transmission of the multiple transport blocks.

The transmission mode component 1125 may identify that a set of packets are scheduled for a downlink transmission to a UE via a packet-group transmission mode. The transmission mode component 1125 may transmit, to the UE, an indication of a capacity condition.

The packet scheduler 1130 may determine one or more packets of the set of packets for inclusion in a transmission payload for the downlink transmission in accordance with the packet-group transmission mode.

In some examples, the packet scheduler 1130 may determine the one or more packets such that all packets of at least one packet-group are included in the transmission payload.

In some examples, the packet scheduler 1130 may determine the one or more packets based on a resource amount allocated for the downlink transmission to the UE.

In some examples, the packet scheduler may determine the one or more packets such that the transmission payload includes packets associated with relative to a quantity of packet groups that the resource capacity supports. In some examples, determining the one or more packets such that the transmission payload includes packets associated with a reduced quantity of partial packet-groups relative to a quantity of partial packet groups that the resource capacity supports. In some examples, the packet scheduler 1130 may determine the one or more packets based on a packet-group information, where the one or more packets are associated with a packet-group that corresponds to the packet-group information. In some examples, the packet scheduler 1130 may determine the one or more packets based on a file delay budget or a file error rate.

In some cases, the set of packets are organized in one or more packet-groups. In some cases, the packet-group information corresponds to a packet-group type, a packet-group priority, a packet delivery deadline, or a combination thereof. In some cases, the one or more packets are associated as a file. In some cases, the one or more packets are associated with a same delivery deadline. In some cases, the one or more packets of the file are configured to be processed together.

The packet transmitting interface 1135 may transmit, to the UE, the downlink transmission in accordance with the packet-group transmission mode. In some examples, the packet transmitting interface 1135 may transmit the transmission payload for the downlink transmission such that the one or more packets are selected in a non-first-in first-out order. The receiving component 1120 may receive the one or more packets organized into one or more groups in accordance with the packet-group transmission mode.

Figure 12:
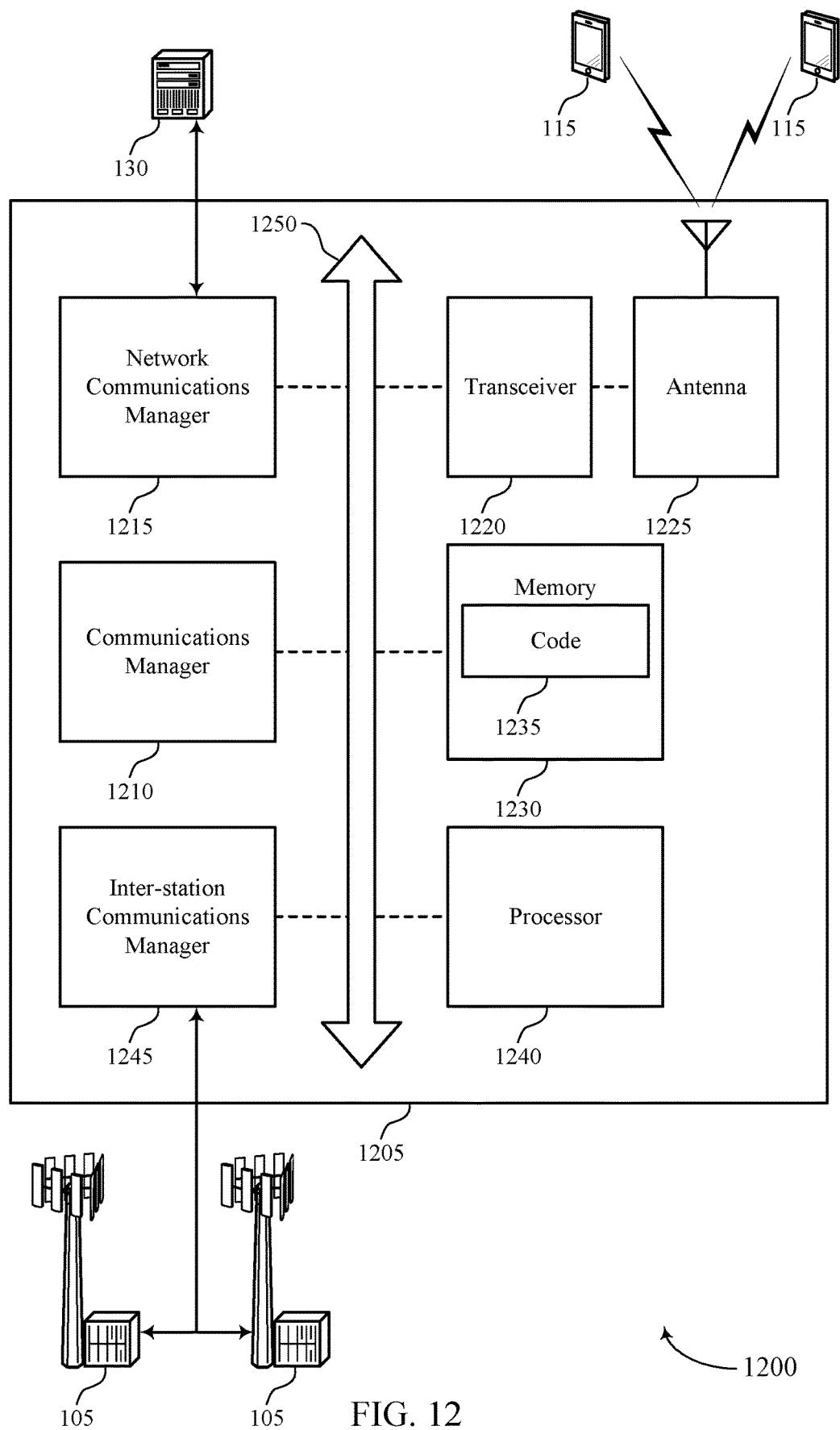
FIG. 12 shows a diagram of a system including a device that supports traffic-aware grant signaling and processing in accordance with aspects of the present disclosure.

FIG. 12 shows a diagram of a system 1200 including a device 1205 that supports traffic-aware grant signaling and processing in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a user equipment (UE), an uplink grant for an uplink transmission from the UE to the base station, where the uplink grant specifies a packet transmission mode from a default transmission mode or a packet-group transmission mode for the uplink transmission, where the packet-group transmission mode specifies that a set of packets that are associated as a packet-group are included in a transmission payload of the uplink transmission. The communications manager 1210 may also identify that a set of packets are scheduled for a downlink transmission to a UE via the packet-group transmission mode, determine one or more packets of the set of packets for inclusion in the transmission payload for the downlink transmission in accordance with the packet-group transmission mode, and transmit, to the UE, the downlink transmission in accordance with the packet-group transmission mode.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting traffic-aware grant signaling and processing).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
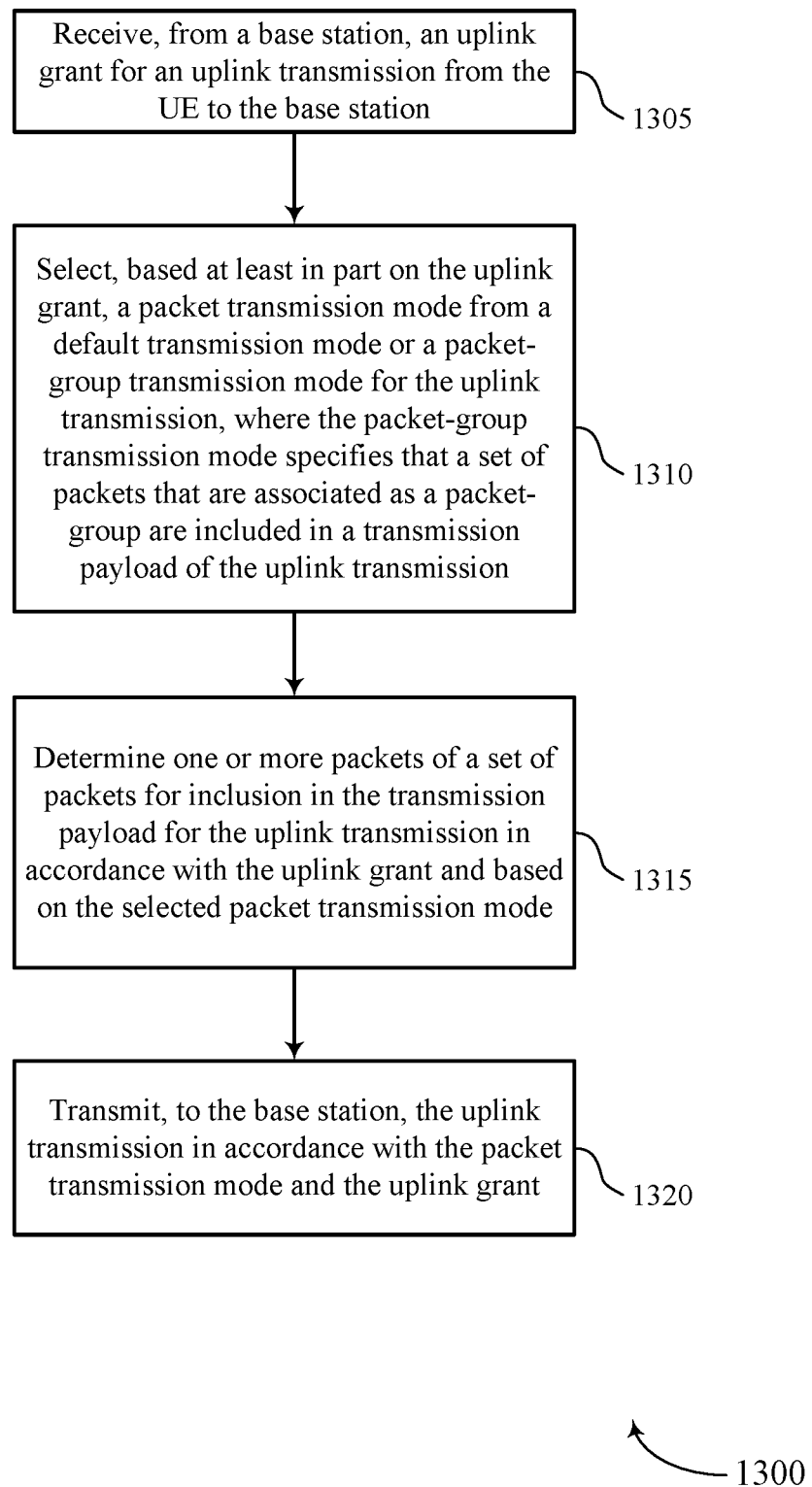
FIGS. 13 through 17 show flowcharts illustrating methods that support traffic-aware grant signaling and processing in accordance with aspects of the present disclosure.

FIG. 13 shows a flowchart illustrating a method 1300 that supports traffic-aware grant signaling and processing in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, an uplink grant for an uplink transmission from the UE to the base station. The operations of 1305 may be performed according to the methods described herein. In some examples, aspects of the operations of 1305 may be performed by an uplink grant receiving component as described with reference to FIGS. 5 through 8.

At 1310, the UE may select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission. The operations of 1310 may be performed according to the methods described herein. In some examples, aspects of the operations of 1310 may be performed by a transmission mode component as described with reference to FIGS. 5 through 8.

At 1315, the UE may determine one or more packets of a set of packets for inclusion in the transmission payload for the uplink transmission in accordance with the uplink grant and based on the selected packet transmission mode. The operations of 1315 may be performed according to the methods described herein. In some examples, aspects of the operations of 1315 may be performed by a packet scheduler as described with reference to FIGS. 5 through 8.

At 1320, the UE may transmit, to the base station, the uplink transmission in accordance with the packet transmission mode and the uplink grant. The operations of 1320 may be performed according to the methods described herein. In some examples, aspects of the operations of 1320 may be performed by a packet transmitting interface as described with reference to FIGS. 5 through 8.

Figure 14:
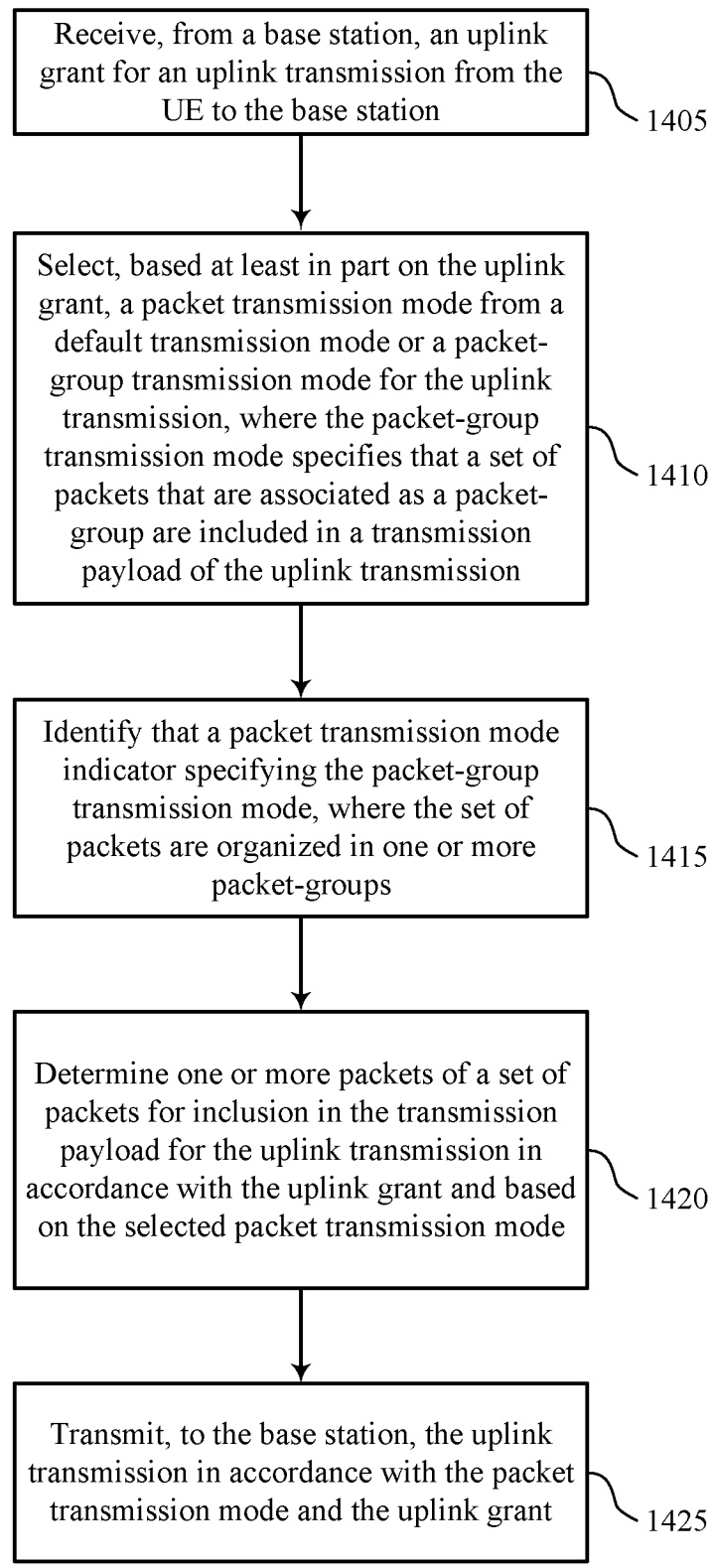

FIG. 14 shows a flowchart illustrating a method 1400 that supports traffic-aware grant signaling and processing in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an uplink grant for an uplink transmission from the UE to the base station. The operations of 1405 may be performed according to the methods described herein. In some examples, aspects of the operations of 1405 may be performed by an uplink grant receiving component as described with reference to FIGS. 5 through 8.

At 1410, the UE may select, based at least in part on the uplink grant, a packet transmission mode from a default transmission mode or a packet-group transmission mode for the uplink transmission, where the packet-group transmission mode specifies that a set of packets that are associated as a packet-group are included in a transmission payload of the uplink transmission. The operations of 1410 may be performed according to the methods described herein. In some examples, aspects of the operations of 1410 may be performed by a transmission mode component as described with reference to FIGS. 5 through 8.

At 1415, the UE may identify that the uplink grant includes a packet transmission mode indicator specifying the packet-group transmission mode, where the set of packets are organized in one or more packet-groups. The operations of 1415 may be performed according to the methods described herein. In some examples, aspects of the operations of 1415 may be performed by a transmission mode component as described with reference to FIGS. 5 through 8.

At 1420, the UE may determine one or more packets of a set of packets for inclusion in the transmission payload for the uplink transmission in accordance with the uplink grant and based on the selected packet transmission mode. The operations of 1420 may be performed according to the methods described herein. In some examples, aspects of the operations of 1420 may be performed by a packet scheduler as described with reference to FIGS. 5 through 8.

At 1425, the UE may transmit, to the base station, the uplink transmission in accordance with the packet transmission mode and the uplink grant. The operations of 1425 may be performed according to the methods described herein. In some examples, aspects of the operations of 1425 may be performed by a packet transmitting interface as described with reference to FIGS. 5 through 8.

Figure 15:
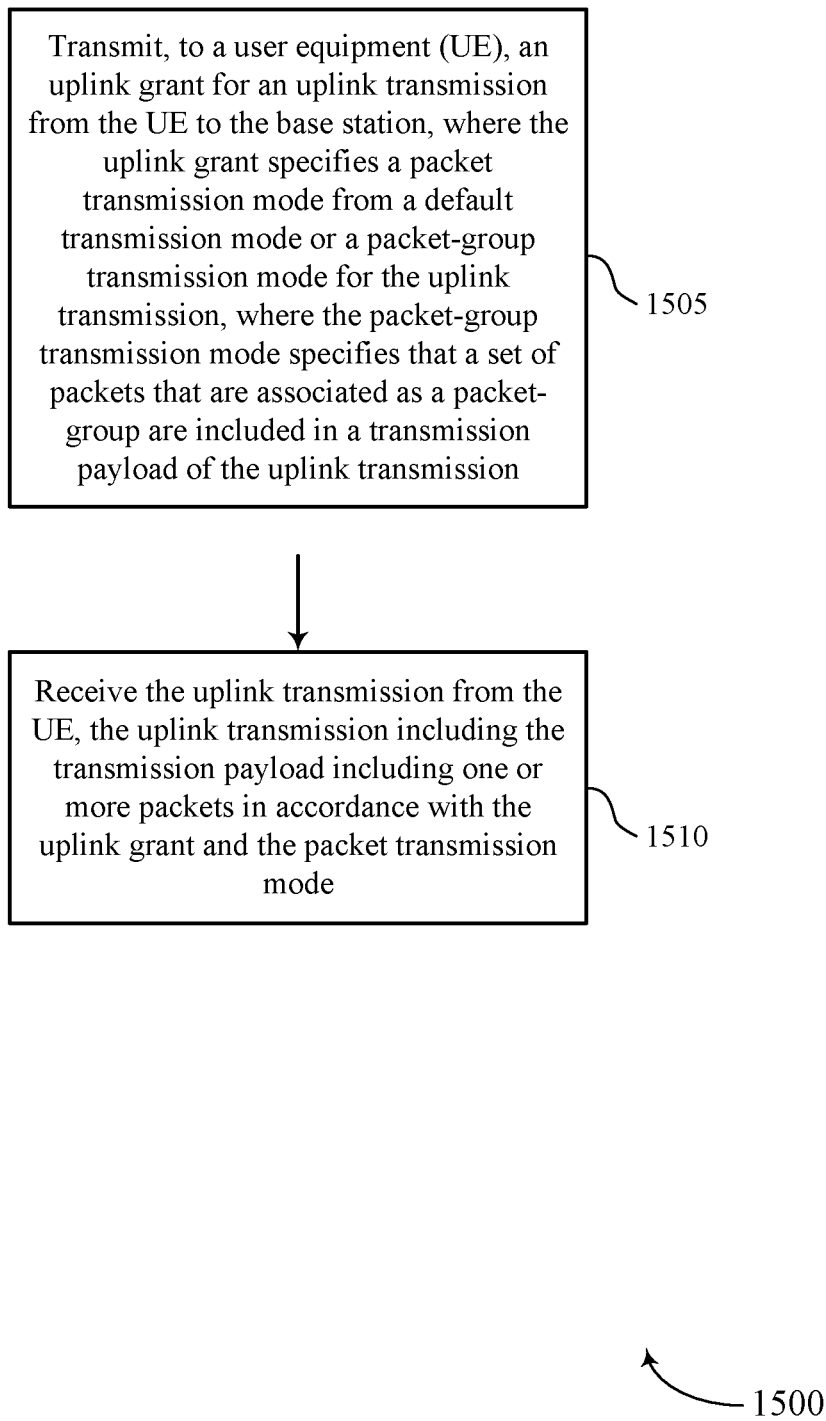

FIG. 15 shows a flowchart illustrating a method 1500 that supports traffic-aware grant signaling and processing in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a user equipment (UE), an uplink grant for an uplink transmission from the UE to the base station, where the uplink grant specifies a packet transmission mode from a default transmission mode or a packet-group transmission mode for the uplink transmission, where the packet-group transmission mode specifies that a set of packets that are associated as a packet-group are included in a transmission payload of the uplink transmission. The operations of 1505 may be performed according to the methods described herein. In some examples, aspects of the operations of 1505 may be performed by an uplink grant transmitting component as described with reference to FIGS. 9 through 12.

At 1510, the base station may receive the uplink transmission from the UE, the uplink transmission including a transmission payload including one or more packets in accordance with the uplink grant and the packet transmission mode. The operations of 1510 may be performed according to the methods described herein. In some examples, aspects of the operations of 1510 may be performed by an uplink transmission receiving component as described with reference to FIGS. 9 through 12.

Figure 16:
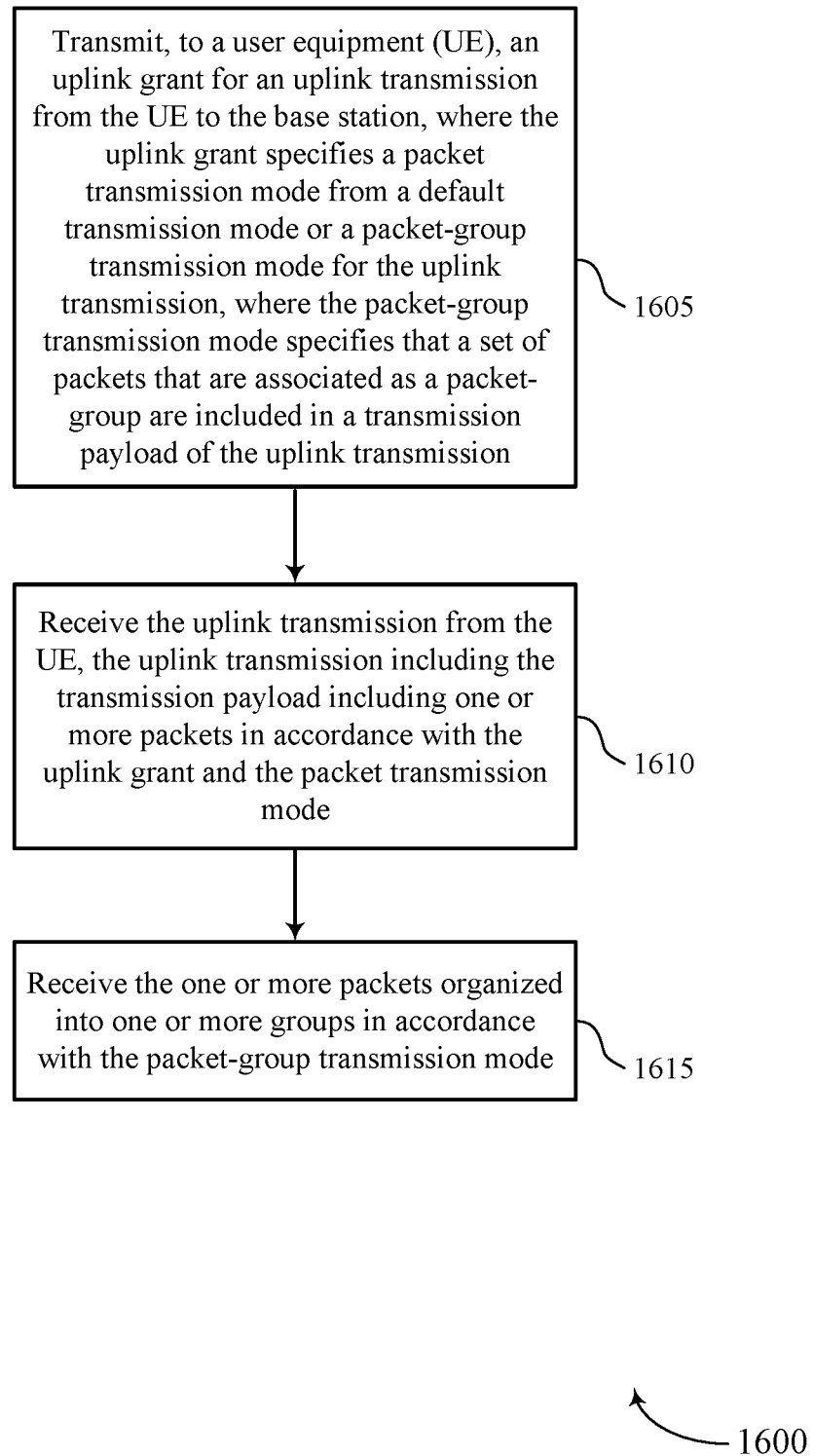

FIG. 16 shows a flowchart illustrating a method 1600 that supports traffic-aware grant signaling and processing in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a user equipment (UE), an uplink grant for an uplink transmission from the UE to the base station, where the uplink grant specifies a packet transmission mode from a default transmission mode or a packet-group transmission mode for the uplink transmission, where the packet-group transmission mode specifies that a set of packets that are associated as a packet-group are included in a transmission payload of the uplink transmission. The operations of 1605 may be performed according to the methods described herein. In some examples, aspects of the operations of 1605 may be performed by an uplink grant transmitting component as described with reference to FIGS. 9 through 12.

At 1610, the base station may receive the uplink transmission from the UE, the uplink transmission including the transmission payload including one or more packets in accordance with the uplink grant and the packet transmission mode. The operations of 1610 may be performed according to the methods described herein. In some examples, aspects of the operations of 1610 may be performed by an uplink transmission receiving component as described with reference to FIGS. 9 through 12.

At 1615, the base station may receive the one or more packets organized into one or more groups in accordance with the packet-group transmission mode. The operations of 1615 may be performed according to the methods described herein. In some examples, aspects of the operations of 1615 may be performed by an uplink grant receiving component as described with reference to FIGS. 9 through 12.

Figure 17:
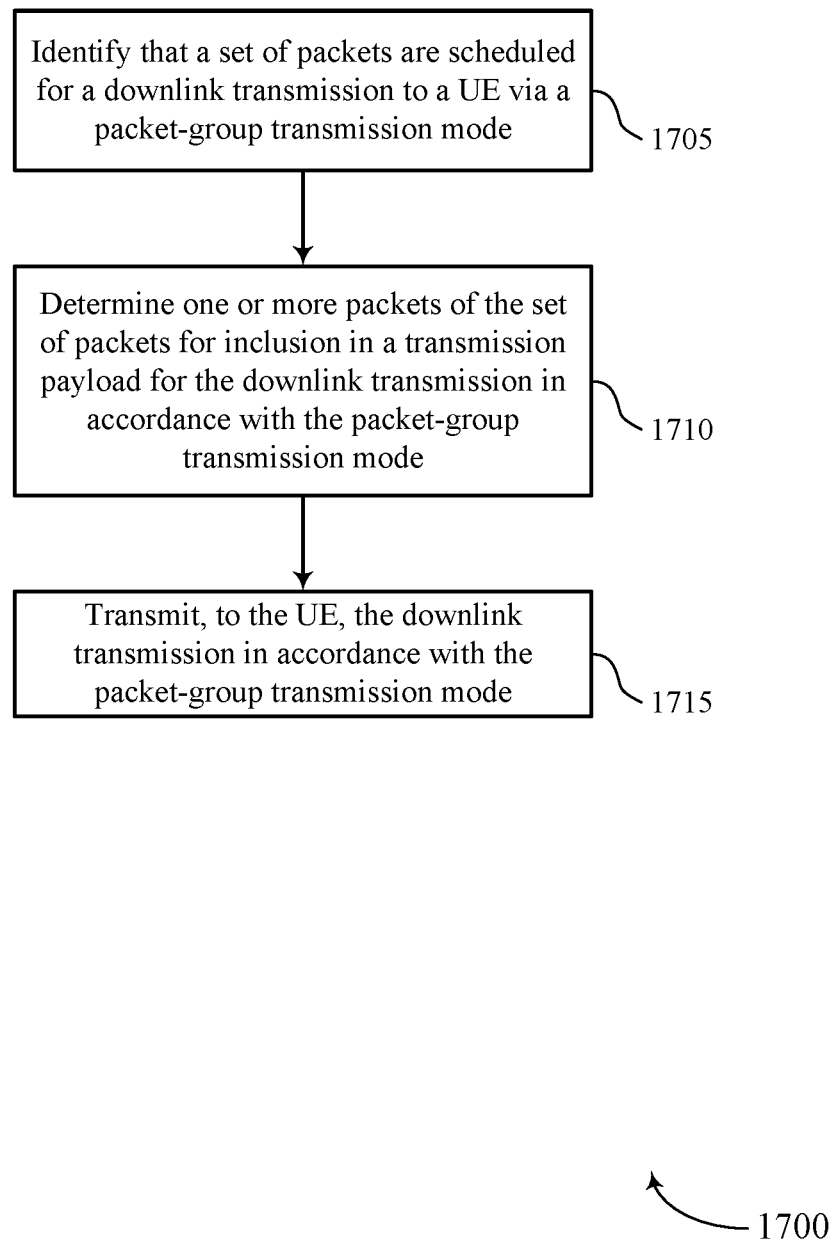

FIG. 17 shows a flowchart illustrating a method 1700 that supports traffic-aware grant signaling and processing in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify that a set of packets are scheduled for a downlink transmission to a UE via a packet-group transmission mode. The operations of 1705 may be performed according to the methods described herein. In some examples, aspects of the operations of 1705 may be performed by a transmission mode component as described with reference to FIGS. 9 through 12.

At 1710, the base station may determine one or more packets of the set of packets for inclusion in a transmission payload for the downlink transmission in accordance with the packet-group transmission mode. The operations of 1710 may be performed according to the methods described herein. In some examples, aspects of the operations of 1710 may be performed by a packet scheduler as described with reference to FIGS. 9 through 12.

At 1715, the base station may transmit, to the UE, the downlink transmission in accordance with the packet-group transmission mode. The operations of 1715 may be performed according to the methods described herein. In some examples, aspects of the operations of 1715 may be performed by a packet transmitting interface as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein

What is claimed is:

1. A method for wireless communication at a user equipment (UE), comprising:
   receiving, from a network device, an uplink grant for an uplink transmission from the UE to the network device;
   selecting, based at least in part on the uplink grant, a packet-group transmission mode for the uplink transmission, wherein the packet-group transmission mode specifies individual packets included in a packet-group include different sets of data indicative of different portions of a video frame;

selecting, from a packet buffer that includes a plurality of packets, one or more packet-groups for inclusion in a transmission payload for the uplink transmission in accordance with the uplink grant and based at least in part on the packet-group transmission mode, wherein a time of arrival of at least one packet of the selected one or more packet-groups at the packet buffer occurs after a time of arrival of one or more unselected packets in the packet buffer; and transmitting, to the network device, the uplink transmission including the transmission payload in accordance with the packet-group transmission mode and the uplink grant.

2. The method of claim 1, wherein selecting the packet-group transmission mode is based at least in part on a packet transmission mode indicator included in the uplink grant, the method further comprising:

identifying that the packet transmission mode indicator specifies the packet-group transmission mode, wherein the plurality of packets are organized in packet-groups.

3. The method of claim 2, wherein selecting the one or more packet-groups for inclusion in the transmission payload further comprises:

selecting the one or more packet-groups such that all packets of at least one packet-group are included in the transmission payload.

4. The method of claim 2, wherein selecting the one or more packet-groups for inclusion in the transmission payload further comprises:

selecting the one or more packet-groups based at least in part on a resource capacity indicated by the uplink grant.

5. The method of claim 2, wherein selecting the one or more packet-groups for inclusion in the transmission payload further comprises:

identifying a resource capacity for the transmission payload; and selecting the one or more packet-groups such that the transmission payload comprises packets associated with a reduced quantity of packet-groups relative to a quantity of packet-groups that the resource capacity supports and based at least in part on the transmission payload satisfying a capacity condition.

6. The method of claim 2, wherein selecting the one or more packet-groups for inclusion in the transmission payload further comprises:

identifying a resource capacity for the transmission payload; and selecting the one or more packet-groups such that the transmission payload comprises packets associated with a reduced quantity of partial packet-groups relative to a quantity of partial packet-groups that the resource capacity supports and based at least in part on the transmission payload satisfying a capacity condition.

7. The method of claim 2, further comprising:

receiving, from the network device, an indication of a capacity condition, wherein the one or more packet-groups are selected based at least in part on satisfaction of the capacity condition.

8. The method of claim 2, wherein selecting the one or more packet-groups for inclusion in the transmission payload further comprises:

selecting the one or more packet-groups based at least in part on a group selection criterion indicated by the uplink grant.

9. The method of claim 8, wherein the group selection criterion indicates a packet-group type criterion or a packet-group priority criterion.

10. The method of claim 2, wherein the uplink grant is for transmission of multiple transport blocks, the method further comprising:

mapping one or more packets of the one or more packet-groups to the multiple transport blocks such that packets associated with a same packet-group are mapped to a same transport block.

11. The method of claim 2, wherein selecting the one or more packet-groups for inclusion in the transmission payload further comprises:

selecting the one or more packet-groups based at least in part on a group quantity limitation indicated by the uplink grant, the group quantity limitation indicating a maximum quantity of groups to be included in the transmission payload.

12. The method of claim 2, wherein selecting the one or more packet-groups for inclusion in the transmission payload further comprises:

selecting the one or more packet-groups based at least in part on a transmission priority associated with the one or more packet-groups.

13. The method of claim 12, wherein the transmission priority is based at least in part on a delivery deadline associated with the one or more packet-groups.

14. The method of claim 2, wherein selecting the one or more packet-groups for inclusion in the transmission payload further comprises:

selecting the one or more packet-groups based at least in part on a modulation coding scheme associated with a transport block (TB) indicated by the uplink grant.

15. The method of claim 2, wherein selecting the one or more packet-groups for inclusion in the transmission payload further comprises:

selecting the one or more packet-groups based at least in part on a packet-group type, a packet-group priority, a packet delivery deadline, or a combination thereof.

16. The method of claim 2, wherein transmitting the uplink transmission further comprises:

transmitting the transmission payload for the uplink transmission such that the plurality of packets are selected in a non-first-in first-out order.

17. The method of claim 2, wherein selecting the one or more packet-groups for inclusion in the transmission payload further comprises:

receiving, from the network device, an indication of a file delay budget or a file error rate; and selecting the one or more packet-groups based at least in part on the file delay budget or the file error rate.

18. The method of claim 2, wherein one or more packets of the one or more packet-groups are associated as a file.

19. The method of claim 18 wherein the one or more packets of the file are configured to be processed together.

20. The method of claim 2, wherein one or more packets of the one or more packet-groups are associated with a same delivery deadline.

21. A method of wireless communication at a network device, comprising:

transmitting, to a user equipment (UE), an uplink grant, including an indication of a file delay budget or a file delay error rate, for an uplink transmission from the UE to the network device, wherein the uplink grant specifies a packet-group transmission mode for the uplink transmission, and wherein the packet-group transmission mode specifies that individual packets included in a packet-group include different sets of data indicative of different portions of a video frame; and
receiving the uplink transmission from the UE, the uplink transmission including a transmission payload including one or more packet-groups in accordance with the uplink grant and the packet-group transmission mode.

22. The method of claim 21, wherein the uplink grant includes a packet transmission mode indicator specifying the packet-group transmission mode, and wherein receiving the uplink transmission comprises:
receiving one or more packets organized into the one or more packet-groups in accordance with the packet-group transmission mode.

23. The method of claim 22, further comprising:
processing the one or more packet-groups in groups in accordance with the packet-group transmission mode.

24. The method of claim 23, wherein processing the one or more packet-groups comprises:
passing packets of each of the one or more packet-groups to an upper layer as one or more protocol data units.

25. The method of claim 21, wherein transmitting the uplink grant further comprises:
transmitting an indication of a resource amount limiting a quantity of packets to be included in the uplink transmission.

26. The method of claim 21, wherein transmitting the uplink grant further comprises:
transmitting a group selection criterion in the uplink grant when the uplink grant specifies the packet-group transmission mode.

27. The method of claim 26, wherein the group selection criterion indicates a packet-group type criterion or a packet-group priority criterion.

28. The method of claim 27, wherein the packet-group priority criterion is based on a delivery deadline associated with packet-groups.

29. The method of claim 21, wherein receiving the uplink transmission from the UE comprises:
receiving one or more packets of the one or more packet-groups mapped to multiple transport blocks such that packets associated with a same packet-group are mapped to a same transport block, wherein the uplink grant is for transmission of the multiple transport blocks.

30. The method of claim 21, wherein one or more packets of the one or more packet-groups are associated as a file.

31. A method of wireless communication at a network device, comprising:
identifying that a plurality of packets are scheduled for a downlink transmission to a user equipment (UE) via a packet-group transmission mode;
selecting, from a packet buffer, one or more packet-groups for inclusion in a transmission payload for the downlink transmission in accordance with the packet-group transmission mode, wherein the packet-group transmission mode specifies that individual packets included in a packet-group include different sets of data indicative of different portions of a video frame, and wherein a time of arrival of at least one packet of the selected one or more packet-groups at the packet buffer occurs after a time of arrival of one or more unselected packets in the packet buffer; and
transmitting, to the UE, the downlink transmission including the transmission payload in accordance with the packet-group transmission mode.

32. The method of claim 31, wherein the plurality of packets are organized in packet-groups.

33. The method of claim 31, wherein selecting the one or more packet-groups for inclusion in the transmission payload further comprises:
selecting the one or more packet-groups such that all packets of at least one packet-group are included in the transmission payload.

34. The method of claim 31, wherein selecting the one or more packet-groups for inclusion in the transmission payload further comprises:
selecting the one or more packet-groups based at least in part on a resource capacity allocated for the downlink transmission to the UE.

35. An apparatus for wireless communication at a user equipment (UE), comprising:
a processor,
memory coupled with the processor; and
instructions stored in the memory and operable, when executed by the processor to cause the apparatus to:
receive, from a network device, an uplink grant for an uplink transmission from the UE to the network device;
select, based at least in part on the uplink grant, a packet-group transmission mode for the uplink transmission, wherein the packet-group transmission mode specifies that individual packets included in a packet-group include different sets of data indicative of different portions of a video frame;
select, from a packet buffer that includes a plurality of packets, one or more packet-groups for inclusion in a transmission payload for the uplink transmission in accordance with the uplink grant and based at least in part on the packet-group transmission mode, wherein a time of arrival of at least one packet of the selected one or more packet-groups at the packet buffer occurs after a time of arrival of one or more unselected packets in the packet buffer; and
transmit, to the network device, the uplink transmission including the transmission payload in accordance with the packet-group transmission mode and the uplink grant.

36. The apparatus of claim 35, wherein selecting the packet-group transmission mode is based at least in part on a packet transmission mode indicator included in the uplink grant, wherein the instructions are further operable, when executed by the processor to cause the apparatus to:
identify that the packet transmission mode indicator specifies the packet-group transmission mode, wherein the plurality of packets are organized in packet-groups.

37. The apparatus of claim 36, wherein the instructions to select the one or more packet-groups for inclusion in the transmission payload further are operable when executed by the processor to cause the apparatus to:
select the one or more packet-groups such that all packets of at least one packet-group are included in the transmission payload.

38. The apparatus of claim 36, wherein the instructions to select the one or more packet-groups for inclusion in the transmission payload further are operable when executed by the processor to cause the apparatus to:
select the one or more packet-groups based at least in part on a resource capacity indicated by the uplink grant.

39. The apparatus of claim 36, wherein the uplink grant is for transmission of multiple transport blocks, wherein the instructions are operable when executed by the processor to cause the apparatus to:

map one or more packets of the one or more packet-groups to the multiple transport blocks such that packets associated with a same packet-group are mapped to a same transport block.

40. The apparatus of claim 36, wherein one or more packets of the one or more packet-groups are associated as a file.

41. An apparatus for wireless communication at a network device, comprising:
a processor,
memory coupled with the processor; and
instructions stored in the memory and operable, when executed by the processor to cause the apparatus to:
transmit, to a user equipment (UE), an uplink grant, including an indication of a file delay budget or a file delay error rate, for an uplink transmission from the UE to the network device, wherein the uplink grant specifies a packet-group transmission mode for the uplink transmission, wherein individual packets included in a packet-group include different sets of data indicative of different portions of a video frame; and
receive the uplink transmission from the UE, the uplink transmission including a transmission payload including one or more packet-groups in accordance with the uplink grant and the packet-group transmission mode.

42. The apparatus of claim 41, wherein the uplink grant includes a packet transmission mode indicator specifying the packet-group transmission mode, and comprises:
receive one or more packets organized into the one or more packet-groups in accordance with the packet-group transmission mode.

43. The apparatus of claim 42, wherein the instructions are further operable, when executed by the processor to cause the apparatus to:
process the one or more packet-groups in groups in accordance with the packet-group transmission mode.

44. The apparatus of claim 43, wherein the instructions to process the one or more packet-groups are operable, when executed by the processor to cause the apparatus to:
pass packets of each of the one or more packet-groups to an upper layer as one or more protocol data units.

45. The apparatus of claim 41, wherein one or more packets of the one or more packet-groups are associated as a file.

46. An apparatus for wireless communication at a network device, comprising:
a processor,
memory coupled with the processor; and
instructions stored in the memory and operable, when executed by the processor to cause the apparatus to:
identify that a plurality of packets are scheduled for a downlink transmission to a user equipment (UE) via a packet-group transmission mode;
select, from a packet buffer, one or more packet-groups for inclusion in a transmission payload for the downlink transmission in accordance with the packet-group transmission mode, wherein the packet-group transmission mode specifies that individual packets included in a packet-group include different sets of data indicative of different portions of a video frame, and wherein a time of arrival of at least one packet of the selected one or more packet-groups at the packet buffer occurs after a time of arrival of one or more unselected packets in the packet buffer; and
transmit, to the UE, the downlink transmission including the transmission payload in accordance with the packet-group transmission mode.

47. An apparatus for wireless communication at a user equipment (UE), comprising:
means for receiving, from a network device, an uplink grant for an uplink transmission from the UE to the network device;
means for selecting, based at least in part on the uplink grant, a packet-group transmission mode for the uplink transmission, wherein the packet-group transmission mode specifies that individual packets included in a packet-group include different sets of data indicative of different portions of a video frame;
means for selecting, from a packet buffer that includes a plurality of packets, one or more packet-groups for inclusion in a transmission payload for the uplink transmission in accordance with the uplink grant and based at least in part on the packet-group transmission mode, wherein a time of arrival of at least one packet of the selected one or more packet-groups at the packet buffer occurs after a time of arrival of one or more unselected packets in the packet buffer; and
means for transmitting, to the network device, the uplink transmission including the transmission payload in accordance with the packet-group transmission mode and the uplink grant.

48. The apparatus of claim 47, wherein selecting the packet-group transmission mode is based at least in part on a packet transmission mode indicator included in the uplink grant, further comprising:
means for identifying that the packet transmission mode indicator specifies the packet-group transmission mode, wherein the plurality of packets are organized in packet-groups.

49. The apparatus of claim 48, wherein the means for selecting the one or more packet-groups for inclusion in the transmission payload further comprises:
means for selecting the one or more packet-groups such that all packets of at least one packet-group are included in the transmission payload.

50. The apparatus of claim 48, wherein the means for selecting the one or more packet-groups for inclusion in the transmission payload further comprises:
means for selecting the one or more packet-groups based at least in part on a resource capacity indicated by the uplink grant.

51. The apparatus of claim 48, wherein the uplink grant is for transmission of multiple transport blocks, further comprising:
means for mapping one or more packets of the one or more packet-groups to the multiple transport blocks such that packets associated with a same packet-group are mapped to a same transport block.

52. The apparatus of claim 48, wherein one or more packets of the one or more packet-groups are associated as a file.

53. An apparatus for wireless communication at a network device, comprising:
means for transmitting, to a user equipment (UE), an uplink grant, including an indication of a file delay budget or a file delay error rate, for an uplink transmission from the UE to the network device, wherein the uplink grant specifies a packet-group transmission mode for the uplink transmission, and wherein the packet-group transmission mode specifies that individual packets included in a packet-group include different sets of data indicative of different portions of a video frame; and means for receiving the uplink transmission from the UE, the uplink transmission including a transmission payload including one or more packet-groups in accordance with the uplink grant and the packet-group transmission mode.

54. The apparatus of claim 53, wherein the uplink grant includes a packet transmission mode indicator specifying the packet-group transmission mode, and comprises:
means for receiving one or more packets organized into the one or more packet-groups in accordance with the packet-group transmission mode.

55. The apparatus of claim 54, further comprising:
means for processing the one or more packet-groups in groups in accordance with the packet-group transmission mode.

56. The apparatus of claim 55, wherein the means for processing the one or more packet-groups comprises:
means for passing packets of each of the one or more packet-groups to an upper layer as one or more protocol data units.

57. The apparatus of claim 53, wherein one or more packets of the one or more packet-groups are associated as a file.

58. A non-transitory computer-readable medium storing code for wireless communication at a user equipment (UE), the code comprising instructions executable by a processor to:
receive, from a network device, an uplink grant for an uplink transmission from the UE to the network device;
select, based at least in part on the uplink grant, a packet-group transmission mode for the uplink transmission, wherein the packet-group transmission mode specifies that individual packets included in a packet-group include different sets of data indicative of different portions of a video frame;
select, from a packet buffer that includes a plurality of packets, one or more packet-groups for inclusion in a transmission payload for the uplink transmission in accordance with the uplink grant and based at least in part on the packet-group transmission mode, wherein a time of arrival of at least one packet of the selected one or more packet-groups at the packet buffer occurs after a time of arrival of one or more unselected packets in the packet buffer; and
transmit, to the network device, the uplink transmission including the transmission payload in accordance with the packet-group transmission mode and the uplink grant.

59. A non-transitory computer-readable medium storing code for wireless communication at a network device, the code comprising instructions executable by a processor to:
transmit, to a user equipment (UE), an uplink grant, including an indication of a file delay budget or a file delay error rate, for an uplink transmission from the UE to the network device, wherein the uplink grant specifies a packet-group transmission mode for the uplink transmission, and wherein the packet-group transmission mode specifies that individual packets included in a packet-group include different sets of data indicative of different portions of a video frame; and
receive the uplink transmission from the UE, the uplink transmission including a transmission payload including one or more packet-groups in accordance with the uplink grant and the packet-group transmission mode.

\* \* \* \* \*